(12) United States Patent
Urata et al.

(10) Patent No.: US 7,266,751 B2
(45) Date of Patent: Sep. 4, 2007

(54) DATA RECORDING METHOD AND DATA RECORDING APPARATUS

(75) Inventors: Kaoru Urata, Kanagawa (JP); Shoji Kosuge, Kanagawa (JP)

(73) Assignee: Sony Corporation (JP)

( * ) Notice: Subject to any disclaimer, the term of this patent is extended or adjusted under 35 U.S.C. 154(b) by 395 days.

(21) Appl. No.: 10/815,689

(22) Filed: Apr. 2, 2004

(65) Prior Publication Data
US 2004/0199854 A1     Oct. 7, 2004

(30) Foreign Application Priority Data
Apr. 4, 2003     (JP) ............... P2003-101296

(51) Int. Cl.
*G11B 20/18*     (2006.01)
(52) U.S. Cl. .................... 714/771; 714/804
(58) Field of Classification Search ............ 714/771, 714/804; *G11B 20/18*
See application file for complete search history.

(56) References Cited

U.S. PATENT DOCUMENTS

2003/0039186 A1*  2/2003  Kuroda ............... 369/47.3

FOREIGN PATENT DOCUMENTS

| JP | 05-153548 | 6/1993 |
| JP | 09-007309 | 1/1997 |
| JP | 09-247709 | 9/1997 |

OTHER PUBLICATIONS

Justeen, Jørn, Error-Correction in Two-Dimensional Fields, Information Theory and it's Applications Workshop, Feb. 6-10, 2006, California Institute for Telecommunications and Information Technology, □□URL: ita.ucsd.edu/workshop/06/talks/papers/80.pdf.*
Entry for "Telop", Wikipedia, Apr. 3, 2006, URL: http://en.wikipedia.org/wiki/Telop.*
Japanese Office Action; Application No.: 2003-101296; Dated: Apr. 3, 2007.

* cited by examiner

*Primary Examiner*—R. Stephen Dildine
(74) *Attorney, Agent, or Firm*—Rader Fishman & Grauer PLLC; Ronald P. Kananen

(57) ABSTRACT

In a data recording method and a data recording apparatus relating to the present invention, ECC blocks using 36 product codes are recorded on 12 tracks through scanning operations performed three times. First of all, first sync-blocks each constituted by adding a C1 parity to the data string of video data constituting an internal encoding calculation data stream are sequentially recorded. When the first sync-blocks are completely recorded, second sync-blocks each constituted by adding the C1 parity to the data string of C2 parity constituting the internal encoding calculation data stream are sequentially recorded. By recording the C2 parity at one time in a later stage, the system delay can be minimized.

11 Claims, 15 Drawing Sheets

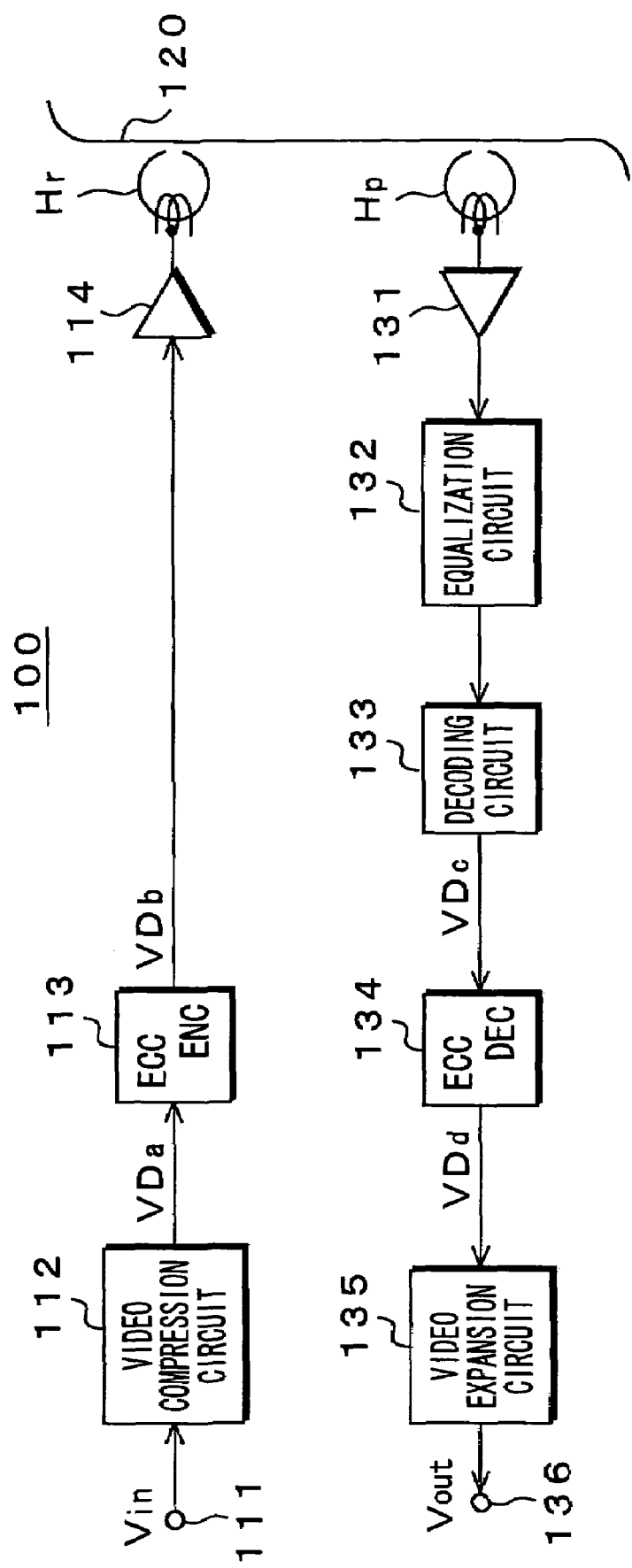

FIG. 10A

ARVU
ARA
ARVL

| 125 | | 114 | 113 | | | | | | | 105 |
| 83 | | | | | | | | | | 63 |
| 41 | | | | | | | | | | 21 |

| 104 | | | | | | | | | | 84 |
| 62 | | | | | | | | | | 42 |
| 20 | | | | | | | | 3 | 2 | 1 | 0 |

0 1 2 3 4 5 6 7 8 9 10 11
12 TRACKS
ORDER OF RECORDING

21 Row

FIG. 10B

| 23 | 5 | 22 | 4 | 21 | 3 | 20 | 2 | 19 | 1 | 18 | 0 |
| 10 | 27 | 9 | 26 | 8 | 25 | 7 | 24 | 6 | 23 | 5 | 22 |
| 32 | 14 | 31 | 13 | 30 | 12 | 29 | 11 | 28 | 10 | 27 | 9 |
| 1 | 18 | 0 | 35 | 17 | 34 | 16 | 33 | 15 | 32 | 14 | 31 |

0 1 2 3
4 TRACKS

9 SYNC-BLOCKS

FIG. 10C

| SYNC | ID | DATA | C1 |
| 2 | 2 | 226 | 16 |

1 TRACK

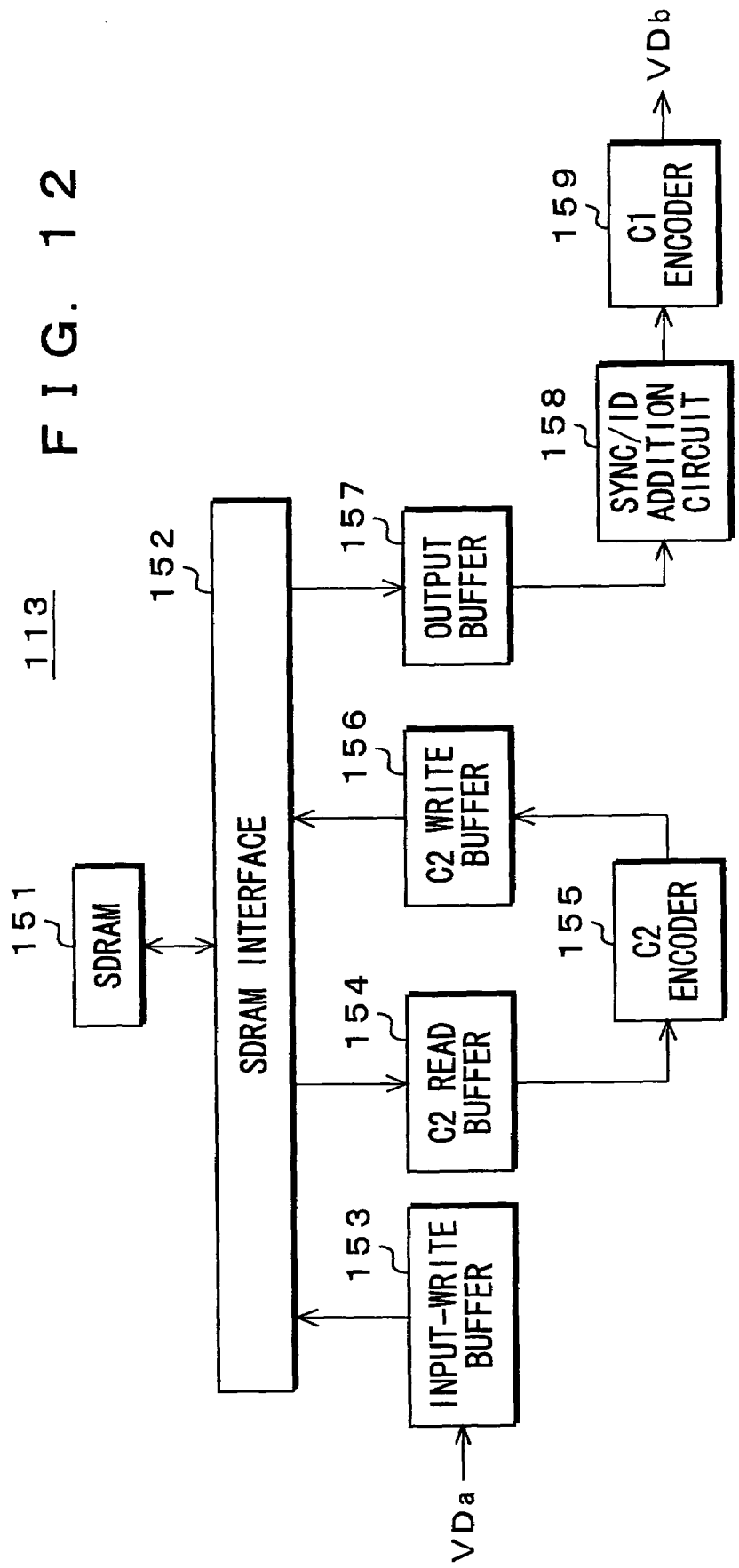

FIG. 16
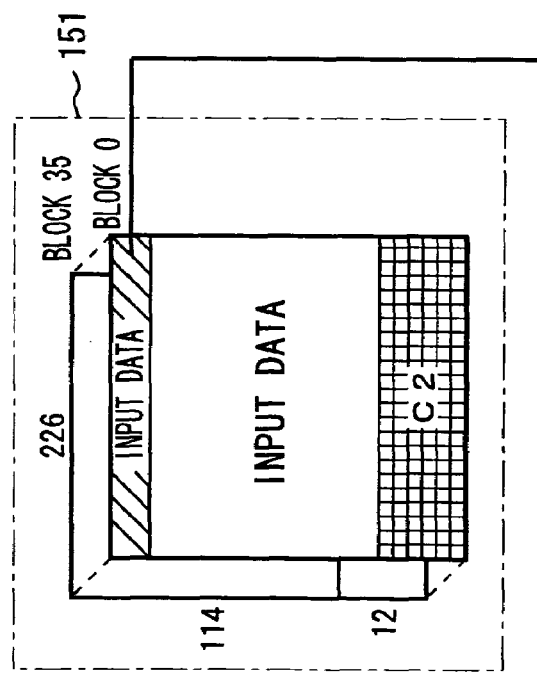
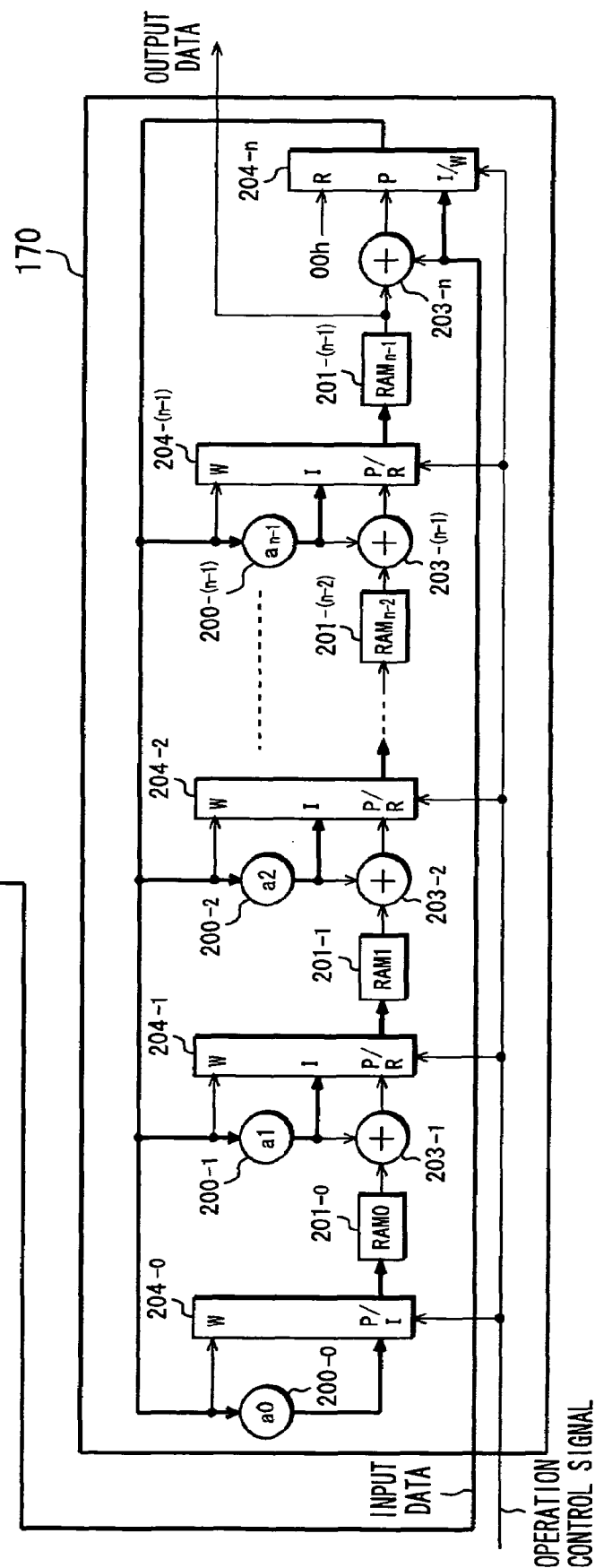

FIG. 17
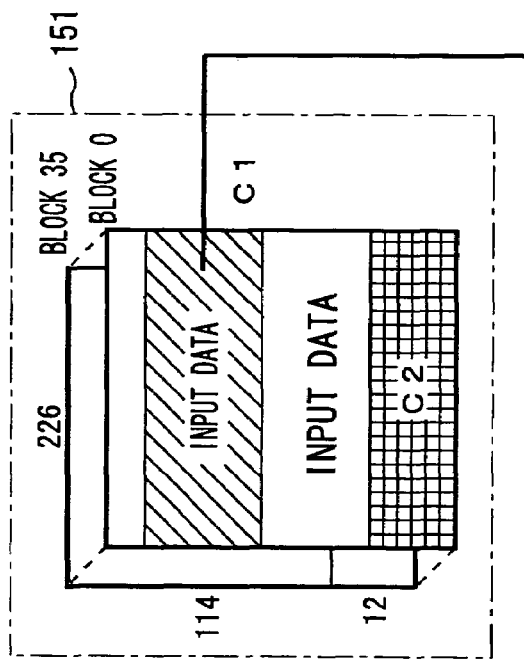
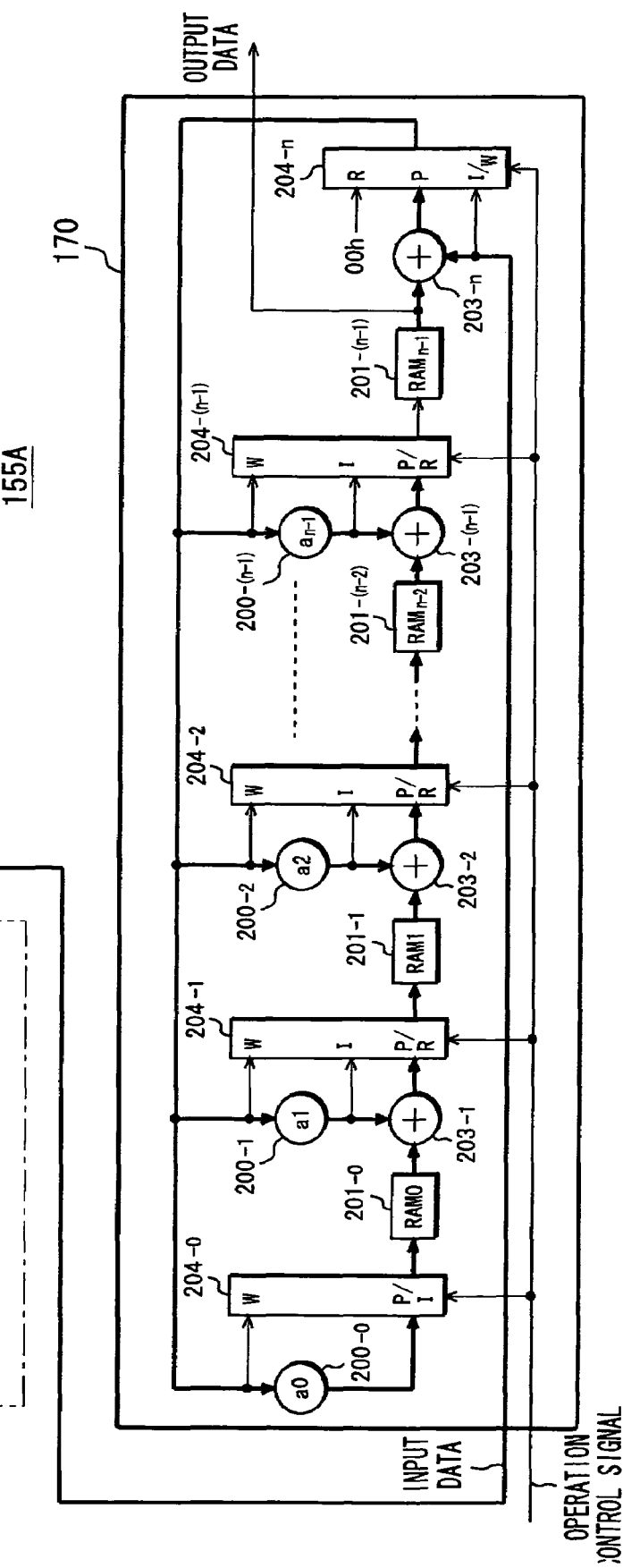

FIG. 19
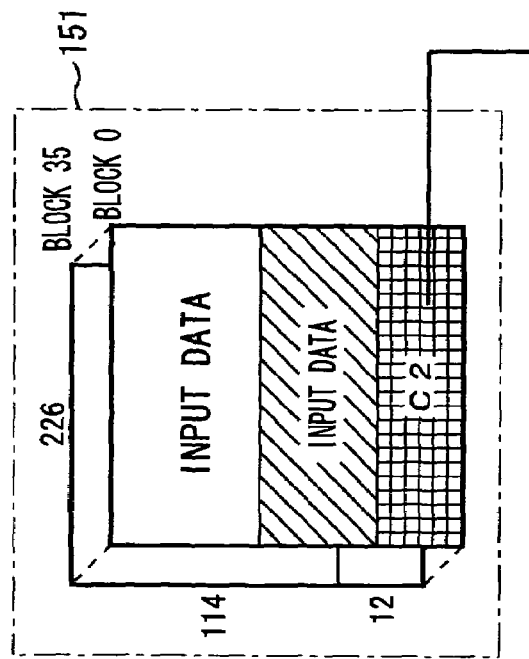
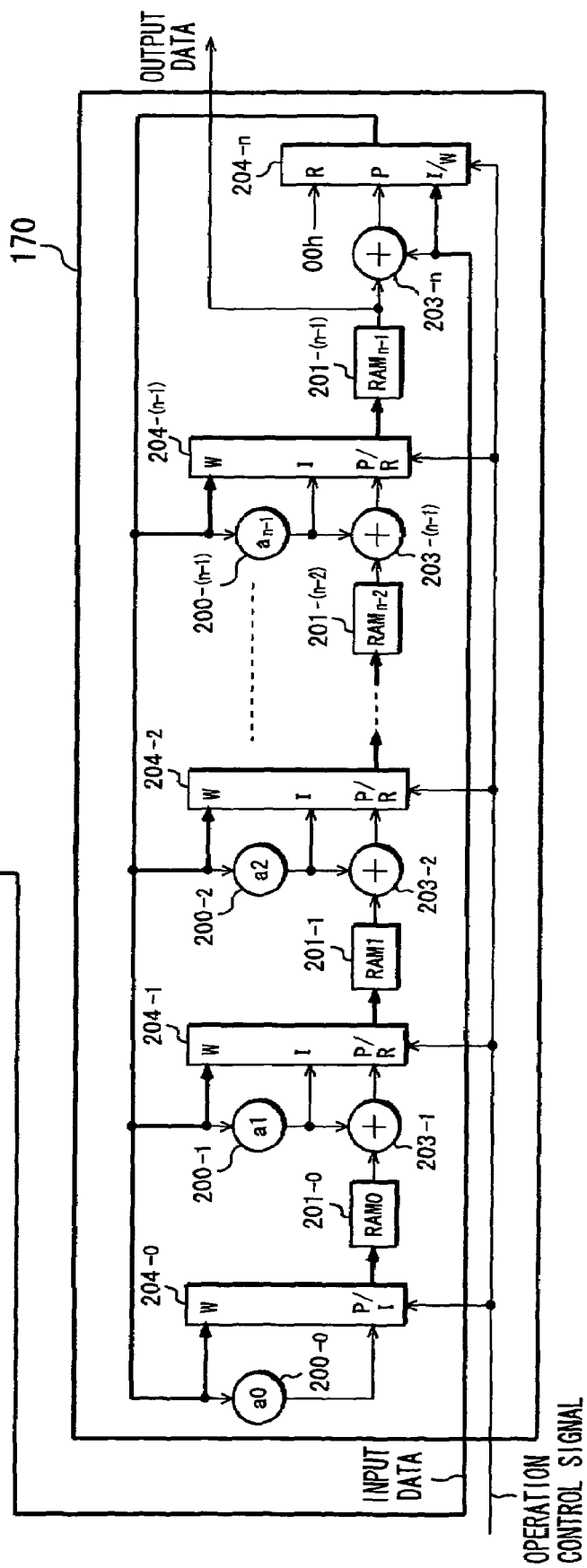

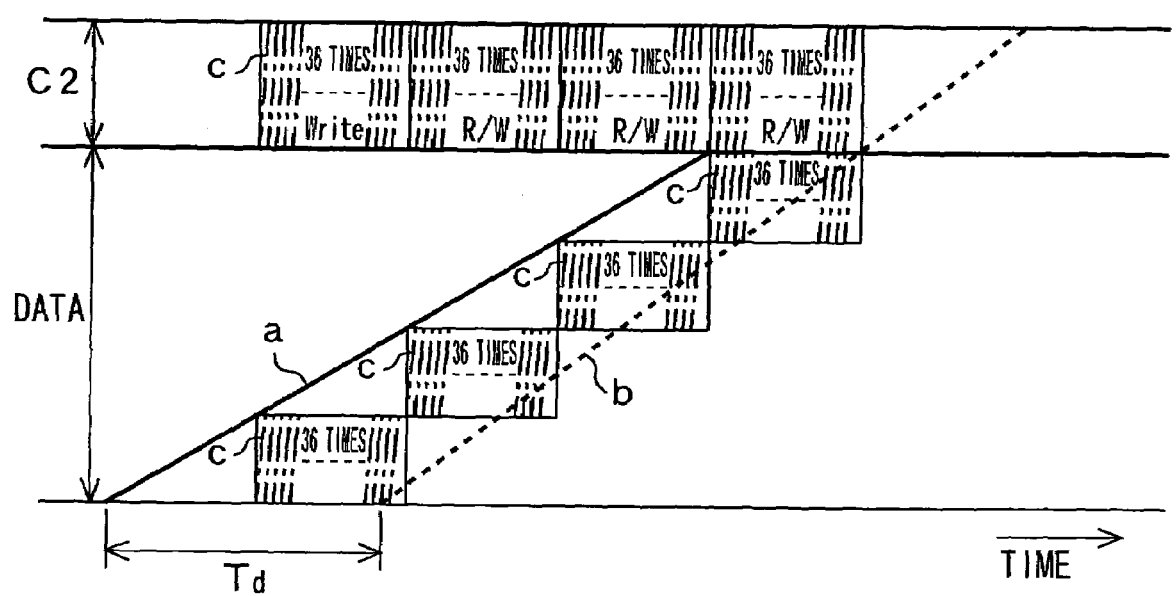
F I G. 2 0

DATA RECORDING METHOD AND DATA RECORDING APPARATUS

BACKGROUND OF THE INVENTION

1. Field of the Invention

The present invention relates to a data recording method and a data recording apparatus preferably for use in a digital video tape recorder and the like, and particularly relates to a data recording method and a data recording apparatus wherein input data is subjected to error correction encoding and the error correction-encoded data is recorded on a recording medium.

2. Description of Related Art

Conventionally, a digital video tape recorder has been proposed in which every group of input video data is subjected to error correction encoding using a product code according to one or a plurality of encoding units. Thus, the error correction-encoded data in one or a plurality of encoding units is recorded on a recording medium, such as on one or a plurality of inclined tracks of a magnetic tape.

As described above, in the digital video tape recorder in which input video data is subjected to error correction encoding using a product code for each encoding unit to record the video data, portions of C2 parities, i.e., external encoding parities are respectively located and recorded on an internal portion and an end portion of each inclined track as shown in FIG. 1, for example. FIG. 1 shows an example where video data of one field is recorded on twelve inclined tracks. In this case, four tracks are simultaneously scanned by four heads at one time, and thus, all of the twelve tracks are scanned through three scanning operations.

When the data is recorded with the portions of C2 parities located at the initial and end portions of each inclined track, a sync-block, constituted by adding a C1 parity, i.e., and internal encoding parity to a data string of the C2 parity which constitutes a C1 calculation data stream, is sequentially recorded on each of the initial and end portions of each inclined track. On the other hand, a sync-block, constituted by adding a C1 parity to a data string of the video data which constitutes a C1 calculation data stream, is sequentially recorded on the center portion of each inclined track.

In this case, it is required that the calculation of the C2 parity has been completed before the portion of this C2 parity is recorded for the first time. For this reason, as a consequence, recording of data on the inclined tracks can be started only after a group of input video data is entirely captured, the C2 parity is calculated, and then the calculation of the C2 parity is completed.

For example, when a group of input video data is one field as described above, on an assumption that time T1 of one field is spent for capturing the entire group of input video data and time T2 is further spent for calculating a part of the C2 parity, the system delay Ta in an error correction code (ECC) encoder is T1+T2, which is a long system delay.

FIG. 2 shows a system delay Ta in a conventional EEC encoder. In FIG. 2, a solid line 1a shows an input processing of video data, whereas a broken line 1b shows an output processing of C2 parity and video data.

If the system delay Ta is long in the ECC encoder as described above, the time required from the initiation of the input of the input data to the initiation of the recording of this input data is also accordingly longer. As a result, the following problems arise.

1) When the video data is reproduced for confirmation immediately after the video data is recorded, the images reproduced by the reproduction video data have a large time deviation from the images produced by the input video data, which causes a user trouble in confirming the images; and 2) In order to execute a pre-read editing operation, the recording and the reproduction heads are attached at largely different heights from each other, which causes the effective track length to be shortened, resulting in deterioration in the signal to noise (S/N).

Herein, the pre-read editing operation means an editing operation in which video data of a specific frame recorded on a specific portion of a tape is reproduced, processing such as insertion of telop data into this video data of specific frame is performed, and then this video data of the specific frame is recorded again on the above-described specific portion of the tape.

FIG. 3 shows an exemplary pre-read editing system. A reproduction head Hp reproduces video data of a specific frame recorded on a specific portion of a tape 301. In this case, a reproduction amplifier 302 amplifies the reproduction signal reproduced on the reproduction head Hp, and an equalization circuit 303 has waveform-equalized the reproduction signal before a decoding circuit 304 receives it. The decoding circuit 304 decodes the waveform-equalized reproduction signal utilizing a Viterbi algorithm, for example.

An error correction code (ECC) decoder 305 receives the video data from the decoding circuit 304. The ECC decoder 305 performs error correction by use of the parities added to the video data. A video expansion circuit 306 receives the error-corrected video data from the ECC decoder 305 and expands the video data.

The video data Va output from the video expansion circuit 306 is supplied to a fixed terminal 307a of a switch circuit SW. On the other hand, telop data St to be inserted to the video data Va is supplied to a fixed terminal 307 b of the switch circuit SW, for example. In this case, the switch circuit SW is connected to the fixed terminal 307b during a period when the telop data ST is supplied, whereas the switch circuit SW is connected to the fixed terminal 307a during the other periods. Thus, the switch circuit SW outputs video data Vb into which the telop data St has been inserted.

A video compression circuit 308 then receives the video data Vb from the switch circuit SW and performs data compression thereto. In this case, for example, the video data Vb is divided into a two-dimensional blocks of 8×8 pixels, and is data-compressed by use of block encoding such as discrete cosine transform (DCT). Although not described above, the video expansion circuit 306 performs processing reversal of this data compression.

An ECC encoder 309 receives the compression-encoded data from the data compression circuit 308. The ECC encoder 309 performs error correction encoding to the compression-encoded data for each encoding unit using a product code. The video data output from the ECC encoder 309 is supplied via a recording amplifier 310 to a recording head Hr that records the reproduction signal corresponding to the video data on the portion of the tape 301 from which the reproduction head Hp has reproduced this video data.

here, during the time "t" from the point where the video data is reproduced by the reproduction head Hp to the point where the video data is recorded by the recording head Hr, the tape 301 travels a distance "d" proportional to the time "t". For this reason, as shown in FIG. 4, the recording head Hr is attached at a position distanced from the reproduction head Hp by a difference (difference in heights between attached positions) "h" in order that, when the tape 301 travels the distance "d", the recording head Hr scans the same portion which the reproduction head Hp scanned time "t" ago.

In this case, the recording head Hr is arranged to be in contact with the tape 301 within a range ARr. Specifically, in order to prevent the tape 301 from being cut by the recording head Hr coming into contact with the end portion of the tape 301, the recording head Hr is arranged to be in contact with the tape 301 at a position inward of the end portion of the tape 301 by a specific distance. Because of this arrangement, the reproduction head Hp comes into contact with the tape 301 within a range ARp. Therefore, this range ARp is an effective track length.

As described above, if the system delay Ta in the ECC encoder is long, the time "t" is long and the distance d is accordingly large. As a result, the step "h" is also large, resulting in a short effective track length ARp. When the effective track length ARp is short as in this case, the recording wavelength is shortened in order to ensure the same capacity of recording data as that of the case where the effective track length ARp is long. However, when the recording wavelength is short, the S/N is degraded.

SUMMARY OF THE INVENTION

An objective of the present invention is to shorten the time required from the initiation of the input of input data to the initiation of the recording of this input data.

According to a data recording method of the present invention, error correction encoding is performed on input data for each encoding unit by use of a product code and the error correction encoded data is recorded on one or a plurality of tracks of a recording medium in one or a plurality of encoding units. First, first sync-block is sequentially recorded on one or a plurality of tracks. The first sync-block is constituted by adding an internal encoding parity (C1 parity) to data string of the input data constituting an internal encoding calculation data stream. After the first sync-block is completely recorded, second sync-block is sequentially recorded. The second sync-block is constituted by adding the internal encoding parity (C1 parity) to a data string of an external encoding parity (C2 parity) constituting the internal encoding calculation data stream.

Thus, the C2 parity is recorded at one time in a later stage. Regarding the C2 parity, it is enough that its calculation has been completed before its recording is started. For this reason, the recording of input data can be initiated even before a group of the input data to be recorded on one or a plurality of tracks is entirely captured. This enables the time required from the initiation of the input of the input data to the initiation of the recording of this input data to be shortened.

Further, a data recording apparatus of the present invention performs error correction encoding an input data for each encoding unit by use of a product code and records the error correction encoded data on one or a plurality of tracks of a recording medium in one or a plurality of encoding units. The apparatus comprises external encoding parity calculator for calculating and obtaining an external encoding parity for each encoding unit from data string constituting an external encoding calculation data stream. The apparatus also comprises internal encoding parity calculator for calculating and obtaining an internal encoding parity for each encoding unit from data string constituting an internal encoding calculation data stream. The apparatus further comprises recorder for recording first sync-block sequentially on one or a plurality of tracks, and recording second sync-block sequentially after the first sync block is completely recorded. The first sync-block is constituted by adding an internal encoding parity obtained by the calculation of the internal encoding parity calculator to data string of the input data constituting an internal encoding calculation data stream. The second sync-block is constituted by adding the internal encoding parity obtained by the calculation of the internal encoding parity calculator to a data string of the external encoding parity obtained by the calculation of the external encoding parity calculator. The data string of the external encoding parity also constitutes the internal encoding calculation data stream.

For example, when error-correction encoded data in m pieces of encoding units (m is an integer of 2 or larger) is recorded on one or a plurality of tracks of a recording medium, at least m pieces of calculating apparatus for calculating C2 parity are provided.

In this case, since the calculation of C2 parity in m pieces of encoding units is simultaneously executed in independent calculating apparatus, the calculations of C2 parity in m pieces of encoding units also can completed when a group of input data to be recorded on one or a plurality of tracks has been entirely captured. As a result, it allows the initiation of C2 parity recording to be made earlier, thereby enabling the initiation of input data recording to be made earlier accordingly.

In addition, for example, when error-correction encoded data in m pieces of encoding units (m is an integer of 2 or larger) is recorded on one or a plurality of tracks of a recording medium, if there are calculating apparatus for calculating C2 parity in the number smaller than m pieces, C2 parity is calculated in each of the m pieces of encoding units of the data with the calculation being divided into a plurality of parts.

Thus, if there are calculating apparatus in the number smaller than m pieces, the calculation of the C2 parity in the respective m pieces of encoding units is initiated after a group of input data to be recorded on one or a plurality of tracks is entirely captured. However, when the calculation of the C2 parity in each of the m pieces of encoding units is performed with the calculation being divided into a plurality of parts, the calculation of the C2 parity in the m pieces of encoding units can be initiated before a group of input data to be recorded on one or a plurality of tracks is still not completely captured. As a result, the calculation of the C2 parity can be completed at an earlier point of time, and the recording of the input data can be initiated at earlier point of time accordingly.

With this arrangement, when the video data is reproduced for confirmation immediately after it is recorded, the invention avoids the images produced by the reproduction video data from having large time deviation from the images produced by the input video data. In this case, the user finds it easy to confirm the images. In addition, in order to execute the pre-read editing operation, the invention avoids the recording head and the reproduction head from being attached to heights largely deviated from each other. In this case, deterioration in S/N due to the shortening of the effective track length can be prevented.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 5 is a block diagram for showing a configuration of a recording and reproducing apparatus as an embodiment of the invention;

FIGS. 10A to 10C are diagrams for illustrating an arrangement of sync-blocks within 12 tracks;

FIG. 12 is a block diagram for showing a configuration of an ECC encoder;

FIG. 16 is a diagram for showing a state of initialization at the time when the calculation of the C2 parity is performed by use of one calculating apparatus with the calculation being divided into a plurality of parts;

FIG. 17 is a diagram for showing a state of calculation at the time when the calculation of the C2 parity is performed by use of one calculating apparatus with the calculation being divided into a plurality of parts;

FIG. 19 is a diagram for showing a state of loading a result obtained at some midpoint of calculation at the time when the calculation of the C2 parity is performed by use of one calculating apparatus with the calculation being divided into a plurality of parts; and FIG. 20 is a diagram for showing a system delay in an ECC encoder (in the case of performing the calculation divided into four parts by use of one calculating apparatus).

DETAILED DESCRIPTION OF THE PREFERRED EMBODIMENTS OF THE INVENTION

Figure 1:
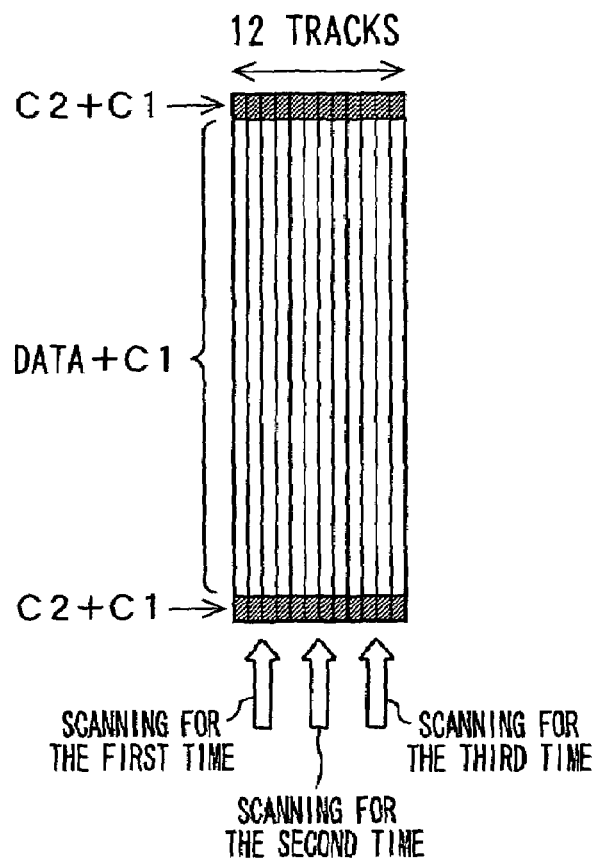
FIG. 1 is a diagram for showing an exemplary conventional arrangement of C2 parities.

Hereinafter, embodiments of the present invention will be described with reference to drawings. FIG. 5 shows a basic configuration of a recording and reproducing apparatus 100 as an embodiment of the invention. For the purpose of simplicity, illustration of an audio system is omitted.

First, a recording system will be described. A video compression circuit 112 receives digital video data Vin through an input terminal 111. The video compression circuit 112 divides the video data Vin into two-dimensional blocks 8×8 pixels, for example, and then performs data-compression using block encoding such as DCT.

An ECC encoder 113 receives video data VDa (compression-encoded data) from the data compression circuit 112. The ECC encoder 113 performs error correction encoding on the compression-encoded data VDa for each encoding unit by use of a product code. A recording head Hr receives the recording video data as error correction encoded data VDb from the ECC encoder 113 through a recording amplifier 114 to record the video data sequentially on the recording tracks of a magnetic tape 120.

In this case, the video data VDb is recorded in its original non-return-to-zero (NRZ) format without digital modulation. Alternatively, the video data VDb may be recorded after it is subjected to digital modulation.

Next, a reproduction system will be described. A reproduction head Hp reproduces a reproduction signal from the recording tracks of the magnetic tape 120 and a reproduction amplifier 131 amplifies the reproduction signal. An equalization circuit 132 has then performed waveform-equalization thereon before a decoding circuit 133 receives it. The decoding circuit 133 decodes the waveform-equalized reproduction signal utilizing Viterbi algorithm, for example, so as to produce reproduction video data VDc corresponding to the recording video data VDb output from the ECC encoder 113 in the recording system described above.

An ECC decoder 134 receives the reproduction video data VDc from the decoding circuit 133. The ECC decoder 134 performs error correction by use of the parities (C1 parity, C2 parity) added to the video data VDc.

A video expansion circuit 135 receives the error-corrected video data (compression encoded data) VDd from the ECC decoder 134. The video expansion circuit 135 performs data expansion through processing reversal of the processing performed by the video compression circuit 112 in the recording system. Then, the video data Vout output from the video expansion circuit 135 is outputted through an output terminal 136.

Figure 6:
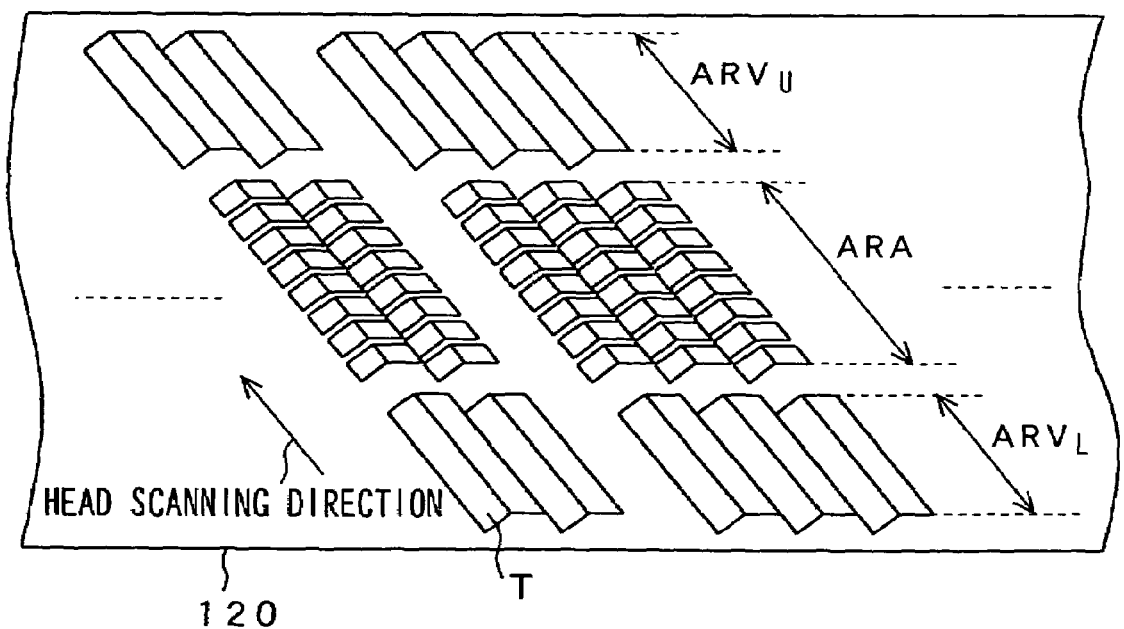
FIG. 6 is a diagram for illustrating a recording format.

FIG. 6 shows a recording format of a magnetic tape 120. On the magnetic tape 120, tracks T inclined with respect to the longitudinal direction of the magnetic tape 120 are sequentially formed. In this case, two adjacent tracks T have different recording azimuths.

Video data areas $ARV_L$, $ARV_U$ are respectively allocated to the end region of the track T at which the scanning is initiated and the end region of the track T at which the scanning is finished. The video data areas $ARV_L$, $ARV_U$ record the recording video data VDb output from the above-described ECC encoder 113. An audio data area ARA is allocated to the area interposed between the video areas $ARV_L$, $ARV_U$ in the track T. This audio data area ARA records recording audio data although an audio system is not illustrated in FIG. 1.

Figure 7:
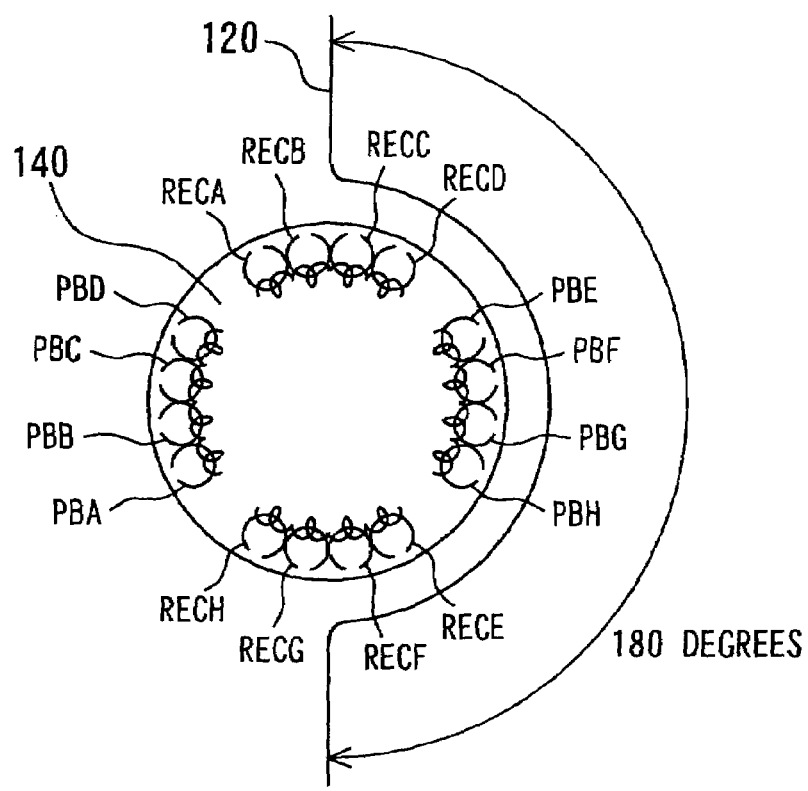
FIG. 7 is a diagram for illustrating an arrangement of magnetic heads.

FIG. 7 is a schematic diagram for showing a structure of a rotating drum in the recording and reproducing apparatus 100 shown in FIG. 5. The magnetic tape 120 is obliquely wound around the rotating drum 140 at a winding angle of 180 degrees. The magnetic tape 120 travels at a specific speed wound around the rotating drum 140.

On the rotating drum 140, four recording heads RECA to RECD are arranged, and additional four recording heads RECE to RECH are arranged at positions 180 degrees apart from the four recording heads RECA to RECD. Further, on the rotating drum 140, eight reproduction heads PBA to PBH corresponding to the recording heads RECA to RECH are arranged at positions 90 degrees apart from the recording heads RECA to RECH, respectively.

Thus, the recording head Hr of the recording and reproducing apparatus 100 shown in FIG. 5 uses eight actual recording heads RECA to RECH as described above. In addition, the reproduction head Hp of the recording and reproducing apparatus 100 shown in FIG. 5 uses eight actual reproduction heads PBA to PBH as described above. Video data of one field is recorded on twelve tracks. At the times of recording and reproduction, four heads simultaneously scan four tracks in one scanning operation, so that twelve tracks can be completely scanned when a scanning operation is conducted three times.

Figure 8:
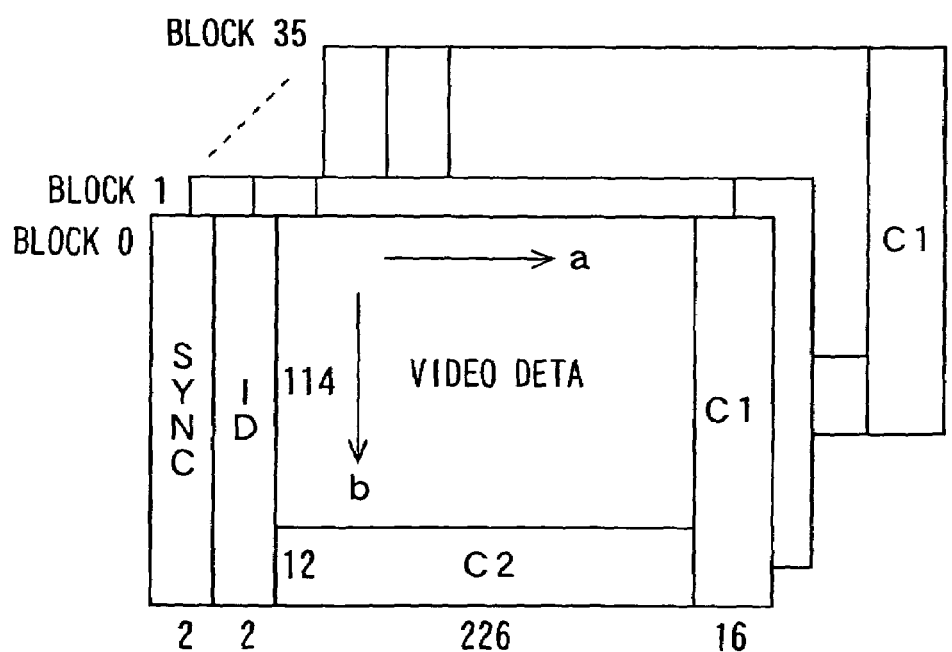
FIG. 8 is a diagram for showing a configuration of an ECC block of video data.

The video data areas $ARV_L$, $ARV_U$ of twelve tracks record 36 ECC blocks from block 0 to block 35 (data in encoding units) as shown in FIG. 8. One ECC block is constituted as follows. Specifically, for the video data constituted by data array of 226×114 bytes, data in each column (i.e., a data string) is encoded according to a (126, 114) Reed-Solomon code, for example, in the external encoding calculation data stream shown by an arrow "b" to generate a C2 parity of a 12-byte external encoding parity. In addition, for the video data and the C2 parity, data in each row or data string is encoded according to a (242, 226) Reed-Solomon code, for example, in the internal encoding calculation data stream shown by an arrow "a" to generate a C1 parity of 16-bytes. At a leading end of each data string, sync-data and ID each having a size of 2-byte are arranged.

Figure 9:
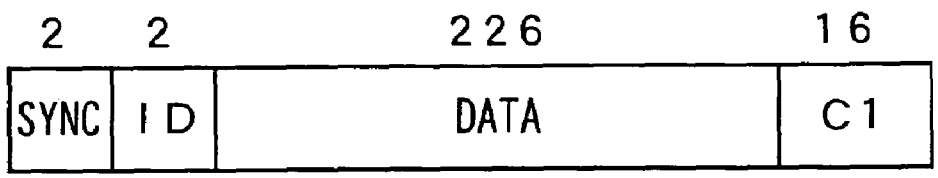
FIG. 9 is a diagram for showing a configuration of one sync-block of video data.

FIG. 9 shows a configuration of a one sync-block in the ECC block. Two bytes at the leading end are sync-data. The subsequent two bytes are ID data. The ID data includes a track ID for identifying which track among twelve tracks records this one sync-block and a sync-block ID for identifying which sync-block among the plurality of sync-blocks recorded on one inclined track is this one sync-block. Further, one segment is constituted for every twelve tracks, and segment numbers from 0 to 3 are repeatedly allocated to the segments sequentially. The two-byte ID described above also includes a segment ID indicating the segment number of the segment that records this one sync-block.

The ID is followed by video data of 226-bytes or a C2 parity, and a C1 parity of 16-bytes.

As described above, twelve tracks on the magnetic tape 120 record 36 ECC blocks (see FIG. 8). FIG. 10 shows an arrangement of sync-blocks in each of the ECC blocks in the video data areas $ARV_L$, $ARV_U$ of twelve tracks, which constitute one segment.

As shown in FIG. 10A, in four tracks 0 to 3, which are scanned for the first time, the video data area $ARV_L$ records sync-blocks of 21 rows from 0th to 20th rows in each of the ECC blocks 0 to 35, whereas the video data area $ARV_U$ records sync-blocks of 21 rows from the 21st to the 41st rows in each of the ECC blocks 0 to 35.

In the four tracks 4 to 7, which are scanned for the second time, the video data area $ARV_L$ records sync-blocks of 21 rows from the 42nd to the 62nd rows in each of the ECC blocks 0 to 35, whereas the video data area $ARV_U$ records sync-blocks of 21 rows from the 63rd to the 83rd rows in each of the ECC blocks 0 to 35.

In four tracks 8 to 11, which are scanned for the third time, the video data area $ARV_L$ records sync-blocks of 21 rows from the 84th to the 104th rows in each of the ECC blocks 0 to 35, whereas the video data area $ARV_U$ records sync-blocks of 21 rows from the 105th to the 125th rows in each of the ECC blocks 0 to 35.

Here, the sync-block of a 0th row is constituted by a 0th sync-block in each of the ECC blocks 0 to 35. As is shown in FIG. 10B, these 36 sync-blocks are divided into four groups so that nine sync-blocks are allocated to each of the tracks 0 to 4. Specifically, the track 0 a records 0th sync-block in each of the ECC blocks 0, 18, 1, 19, 2, 20, 3, 21, and 4; the track 1 records a 0th sync-block in each of the ECC blocks 22, 5, 23, 6, 24, 7, 25, 8, and 26; the track 2 records 0th sync-block in each of the ECC blocks 9, 27, 10, 28, 11, 29, 12, 30, and 13; and the track 3 records a 0th sync-block in each of the ECC blocks 31, 14, 32, 15, 33, 16, 34, 17, and 35.

Hereinafter, in the same manner as described above, the sync-blocks from 1st to 125th rows are respectively constituted by 1st to 125th sync-blocks in each of the ECC blocks 0 to 35. These 36 sync-blocks are divided into four groups so that nine sync-blocks are allocated to and recorded on the corresponding four tracks, respectively. In this case, the ECC blocks taken out from the 9 sync-blocks recorded on each of the 4 tracks are shuffled for every row. As shown in FIG. 10C, the sync-block is constituted by two-byte sync data, a two-byte ID, 226-byte video data (or a C2 parity), and a 16-byte C1 parity.

Here, the sync-blocks of 0th to 125th rows are sequentially recorded on the tracks 0 to 11. In this case, the sync-blocks of the 0th to the 113th rows are respectively constituted by adding a C1 parity to data string of the video data which constitutes an internal encoding calculation data stream, whereas the sync-blocks of 114th to 125th rows are respectively constituted by adding a C1 parity a data string of the C2 parity which constitutes an internal encoding calculation data stream.

Figure 11:
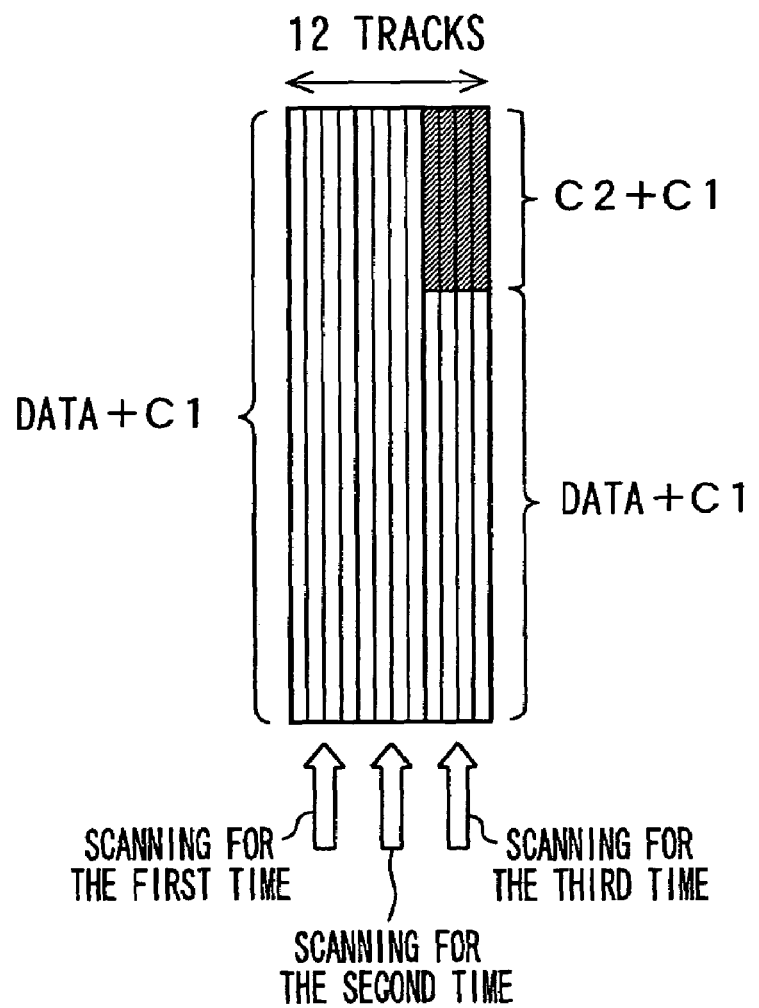
FIG. 11 is a diagram for showing an arrangement of C2 parity.

Specifically, in this embodiment, when 36 ECC blocks 0 to 35 are recorded on 12 tracks, as shown in FIG. 11, the first sync-blocks constituted by adding a C1 parity to the data string of the video data, which constitutes an internal encoding calculation data stream, are sequentially recorded. When the recording of the first sync-blocks is completed, the second sync-blocks constituted by adding a C1 parity to the data string of the C2 parity, which constitutes an internal encoding calculation data stream, are sequentially recorded.

Next, the ECC encoder 113 in the recording and reproducing apparatus 100 shown in FIG. 5 will be described in detail. FIG. 12 shows a configuration of the ECC encoder 113.

The ECC encoder 113 includes a synchronous dynamic RAM (SDRAM) 151 and an SDRAM interface 152 for writing and reading data into and from the SDRAM 151. The SDRAM 151 has a capacity capable of recording video data of a plurality of fields. In this case, in the SDRAM 151, memory spaces corresponding to 36 ECC blocks (see FIG. 8) are prepared for each field.

The ECC encoder 113 also includes an input-write buffer 153 for buffering and writing video data (i.e., compression encoded data) VDa supplied from the video compression circuit 112 into the SDRAM 151, and a C2 read buffer 154 for buffering and supplying the video data corresponding to 36 ECC blocks, which is read from the SDRAM 151, to a C2 encoder 155 described later.

The ECC encoder 113 further includes a C2 encoder 155 for calculating a C2 parity (an external encoding parity) in each of the 36 ECC blocks for each field. The C2 encoder 155 includes 36 calculating apparatus as each for calculating the C2 parity, and can calculate C2 parities in the above-described 36 ECC blocks simultaneously.

Due to this arrangement, video data corresponding to the 36 ECC blocks is simultaneously supplied from the C2 read buffer 154 to the C2 encoder 156. At this time, video data of each of the ECC blocks is supplied in the order of data from the 0th to the 113th sync-blocks.

The ECC encoder 113 further includes a C2 write buffer 156 for buffering and writing C2 parity in each of the 36 ECC blocks, calculated in the C2 encoder 155, into the SDRAM, and output buffer 157 for buffering and outputting video data and the C2 parity, which are read from the SDRAM 151 and correspond to each of the 36 ECC blocks for each field.

The ECC encoder 113 further includes a SYNC/ID addition circuit 158 for adding sync-data and ID to a data string of the video data (or C2 parity) of each sync-block which is output from the output buffer 157 in the order that the video data (or C2 parity) have been recorded, and a C1 encoder 159 for calculating a C1 parity and adding it to the video data of each sync-block to which the sync-data and ID have been added in the SYNC/ID addition circuit 158 and then for outputting the resultant data as recording video data VDb.

An operation of the ECC encoder 113 shown in FIG. 12 will be described.

The video compression circuit 112 (see FIG. 5) supplies the video data (i.e., compressed encoded data) VDa to the SDRAM 151 via the input-write buffer 153 and the SDRAM interface 152 and the SDRAM 151 writes the video data VDa. In this case, the video data VDa of each field is written into the video data areas in the memory spaces of their corresponding 36 ECC blocks, respectively (see FIG. 8).

Further, for each field, the SDRAM 151 reads the video data corresponding to the 36 ECC blocks and supplies the video data to the C2 encoder 155 via the SDRAM interface 152 and the C2 read buffer 154. In this case, the C2 read buffer 154 supplies the video data corresponding to the 36 ECC blocks simultaneously to the C2 encoder 155. Further, in this case, the video data of each ECC block is supplied in the order of the data of the 0th to the 113th sync blocks.

The C2 encoder 155 simultaneously calculates C2 parity in each of the 36 ECC blocks for each field by use of 36 calculators. The C2 encoder 155 supplies the C2 parity thus calculated, for each field, in each of the 36 ECC blocks to the SDRAM 151 via the C2 write buffer 156 and the SDRAM interface 152. The C2 parity is then written into the C2 parity areas in the memory spaces of their corresponding 36 ECC blocks.

Further, the SDRAM 151 reads the video data and C2 parity, which correspond to each of the 36 blocks, for each field and supplies them to the outputs buffer 157 via the SDRAM interface 152. The output buffer 157 then outputs the video data (or C2 parity) of each sync-block in the order that the video data have been recorded and supplies that video data to the C1 encoder 159 after sync-data and ID are added to the video data in the SYNC/ID addition circuit 158.

Then, the C1 encoder 159 calculates a C1 parity therefrom and adds it to the video data of each sync-block to which the sync-data and ID have been added, so as to produce each sync-block as recording video data VDb. The recording video data VDb is supplied to the recording amplifier 114 (see FIG. 5) as described above.

Figure 13:
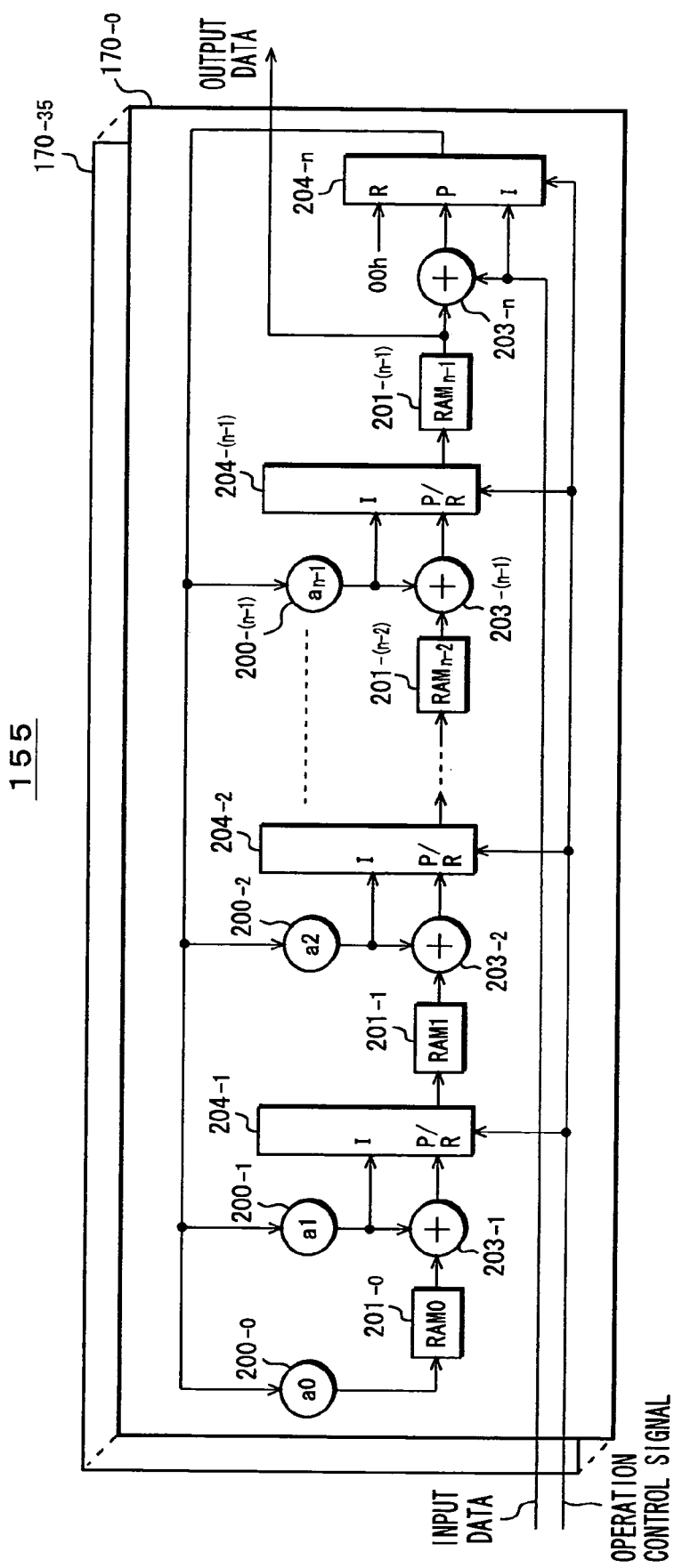
FIG. 13 is a block diagram for showing a configuration of a C2 encoder.

Next, the C2 encoder 155 will be described in detail. FIG. 13 shows a configuration of the C2 encoder 155. The C2 encoder 155 includes 36 calculating apparatus $170_{-0}$ to $170_{-35}$. The calculating apparatus $170_{-0}$ to $170_{-35}$ calculates C2 parity in one ECC block.

Hereinafter, the calculating apparatus $170_{-0}$ to $170_{-35}$ will be described. Since each of the calculating apparatus $170_{-0}$ to $170_{-35}$ has an identical structure to each other, only the calculating apparatus $170_{-0}$ will be described.

The calculating apparatus $170_{-0}$ includes n matrix calculators $200_{-0}$ to $200_{-(n-1)}$, of RAMs $201_{-0}$ to $201_{-(0-1)}$ for producing codes in vertical direction, n– exclusive OR gates for calculating exclusive-OR (hereinafter, referred to as "EX-OR gates") $203_{-1}$ to $203_{-n}$, and n selectors $204_{-1}$ to $204_{-n}$.

Here, the output from the matrix calculator $200_{-0}$ is supplied to the RAM $201_{-0}$ as write data. The outputs from the selectors $204_{-1}$ to $204_{-(n-1)}$ are respectively supplied to the RAMs $201_{-1}$ to $201_{-(n-1)}$ as write data. The outputs from the matrix calculators $200_{-1}$ to $200_{-(n-1)}$ are respectively supplied to I sides of the selectors $304_{-1}$ to $204_{-(n-1)}$ and also supplied to the EX-OR gates $203_{-1}$ to $203_{-(n-1)}$.

The items of the read data from the RAMs $201_{-0}$ to $201_{-(n-1)}$ are respectively supplied to the EX-OR gates $203_{-1}$ to $203_{-n}$. The outputs from the EX-OR gates $203_{-1}$ to $203_{-(n-1)}$ are respectively supplied to P and R sides of the selectors $204_{-1}$ to $204_{-(n-1)}$, whereas the output from the EX-OR gate $203_{-n}$ is supplied to the P side of the selector $204_{-n}$.

A value "00h" is supplied to the R side of the selector $204_{-n}$. The "h" means that this value is in hexadecimal. Input data is supplied to the EX-OR gate $203_{-n}$ and I side of selector $204_{-n}$. Then, output is taken out from the RAM $201_{-(n-1)}$. Further, the output from the selector $204_{-n}$ is supplied to the matrix calculators $200_{-0}$ to $200_{-(n-1)}$ as feedback data.

The selectors $204_{-1}$ to $204_{-n}$ receives an operation control signal, respectively. In this case, the selectors $204_{-1}$ to $204_{-n}$ output the data which has been supplied to their I sides at the time of initialization whereas the selectors $204_{-1}$ to $204_{-n}$ output the data which has been supplied to their P sides at the time of calculation. At the time of outputting the result obtained from the calculation of the C2 parity, the selectors $204_{-1}$ to $204_{-n}$ output the data, which has been supplied to their R sides.

The RAMs $201_{-0}$ to $201_{-(n-1)}$ have a word length in data length of an internal encoding calculation data stream, that is, 226-byte word length. The n is in an identical number to the byte number of the C2 parity, that is, 12.

Next, operations of the calculating apparatus $170_{-0}$ will be described.

First, initialization is performed based on data of the first one symbol (herein, one-byte) among input data to be encoded. In this case, actually, 226 items of byte data in data length of the internal encoding calculation data stream, that is, each corresponding to 226 streams related to the external encoding calculation data streams are sequentially supplied. At the time of initialization, the selectors $204_{-1}$ to $204_{-(n-1)}$ respectively output the data which has been supplied to their I sides. Therefore, at the time of this initialization, the selectors $204_{-1}$ to $204_{-(n-1)}$ respectively supply the outputs from the matrix calculators $200_{-1}$ to $200_{-(n-1)}$ to the subsequent stages without undertaking any processing, and the selector $204_{-n}$ outputs input data.

As a result, the first one symbol is supplied to the matrix calculators $200_{-0}$ to $200_{-(n-1)}$ as feedback data without undergoing any processing. Then, the result of a calculation performed by the matrix calculator $200_{-0}$ is stored at an address position of the $RAM_{201-0}$ which corresponds to one symbol stream (i.e. any one of 226 streams related to the external encoding calculation data stream) of input data at the time. Further, the results of calculations performed by the matrix calculators $200_{-1}$ to $200_{-(n-1)}$ are respectively stored at address positions of the RAMs $201_{-1}$ to $201_{-(n-1)}$ which correspond to one symbol stream of input data at that time via the selectors $204_{-1}$ to $204_{-(n-1)}$ respectively. In this manner, initialization is performed. As described above, 226 items of byte data are sequentially supplied as the first one symbol, thereby executing initialization for 226 streams related to the external encoding calculation data stream.

Next, a C2 parity is calculated. At the time of the calculation of the C2 parity, the selectors $204_{-1}$ to $204_{-n}$ respectively output the data, which has been supplied to their P sides. Therefore, at the time of this calculation, the selectors $204_{-1}$ to $204_{-n}$ respectively supply the outputs from the EX-OR gates $203_{-1}$ to $203_{-n}$ to the subsequent stages.

Among input data, items of data of one symbol of a second or later are sequentially supplied to the EX-OR gate $203_{-n}$. In this case, as the data of one symbol of the second or later, actually, 226 items of byte data which respectively correspond to the 226 streams related to the external encoding calculation data stream are sequentially supplied. Data of the stream, which is read from the RAM $201_{-(n-1)}$ located at the last stage and corresponds to one symbol stream of the input data at that time, is supplied to the EX-OR gate $203_{-n}$.

The EX-OR gate $203_{-n}$ calculates exclusive-OR of data of each of the second symbols and thereafter and the data which has been read from the RAM $201_{-(n-1)}$. The output from the EX-OR gate $203_{-n}$ is supplied to each of the matrix calculators $200_{-0}$ to $200_{-n(n-1)}$ as feedback data via the selector $204_{-n}$.

Then, the result of a calculation performed by the matrix calculator $200_{-0}$ is stored at an address position corresponding to one symbol stream of input data of the RAM $201_{-0}$ at that time. The results of calculations performed by the matrix calculators $200_{-1}$ to $200_{-(n-1)}$ and the data of the stream which are read from RAMs $200_{-1}$ to $200_{-(n-1)}$ and correspond to the stream of input data at that time are supplied to the EX-OR gates $203_{-1}$ to $203_{-(n-1)}$ respectively. The EX-OR gates $203_{-1}$ to $203_{-(n-1)}$ calculate exclusive-OR thereon. The outputs from the EX-OR gates $203_{-1}$ to $203_{-(n-1)}$ are respectively stored at address positions of the RAM $203_{-1}$ to RAM $201_{-(n-1)}$ which correspond to one symbol stream of input data at that time via the selectors $204_{-1}$ to $204_{-(n-1)}$ respectively.

As described above, 226 items of byte data are sequentially supplied as data of one symbol of the second or later, thereby executing calculation for 226 streams related to the external encoding calculation data stream. When all of 114 symbols (114 bytes) in data length of the external encoding calculation data stream are completely input, the calculation of the C2 parity is completed. In this case, C2 parity for 226 streams is stored in the RAMs $201_{-0}$ to RAM $201_{-(n-1)}$.

Next, the C2 parity for 226 streams, which is obtained as a result of calculations, is output. At the time of this output, the selectors $204_{-1}$ to $204_{-n}$ respectively output the data, which has been supplied to their R sides. Therefore, at the time of this output, the selectors $204_{-1}$ to $204_{-(n-1)}$ respectively supply the outputs from the EX-OR gates $203_{-1}$ to $203_{-(n-1)}$ to the subsequent stages, and the selector $204_{-n}$ outputs from "00h".

In this case, "00h" is supplied to the matrix calculators $200_{-0}$ to $200_{-(n-1)}$ as feedback data. When the feedback data is "00h", the matrix calculators $200_{-0}$ to $200_{-n(n-1)}$ output "00h". Therefore, the EX-OR gates $203_{-1}$ to $203_{-(n-1)}$ other than that located the last stage, which operate based on the outputs from the matrix calculators $200_{-1}$ to $203_{-(n-1)}$ and the read data from the RAMs $201_{-0}$ to $203_{-(n-2)}$ always output read data from the RAM $201_{-0}$ to $201_{-(n-2)}$ without undertaking any processing to the read data.

In summary, in this case, the RAMs $201_{-0}$ to $201_{-(n-1)}$ simply operate as shift registers. Therefore, the RAM $201-(n-1)$ located at the last stage sequentially outputs the C2 parity for 226 streams related to the external encoding calculation data stream.

As described above, in this embodiment, at the time of recording 36 ECC blocks on 12 tracks, the first sync-blocks which are constituted by adding the C1 parity to the data string of the video data constituting the internal encoding calculation data stream are sequentially recorded first. When all of the first sync-blocks are completely recorded, the second sync-blocks which are constituted by adding the C1 parity to the data string of C2 parity constituting the internal encoding calculation data stream are sequentially recorded (see FIG. 11).

As described above, the C2 parity is recorded at one time in a later stage, and it is enough that the calculations of the C2 parity are completed before their recording is started. Therefore, before video data of one field, which is a group of the video data to be recorded on twelve tracks, is entirely captured in the ECC encoders 113, the recording of the video data can be started. This allows the time required from the initiation of the input of the video data to the initiation of the recording of this video data to be shortened.

Figure 2:
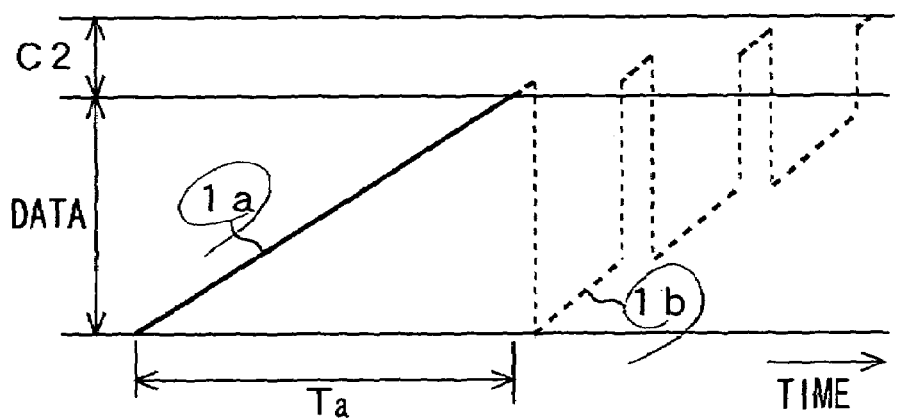
FIG. 2 is a diagram for showing a system delay in a conventional ECC encoder.
Figure 3:
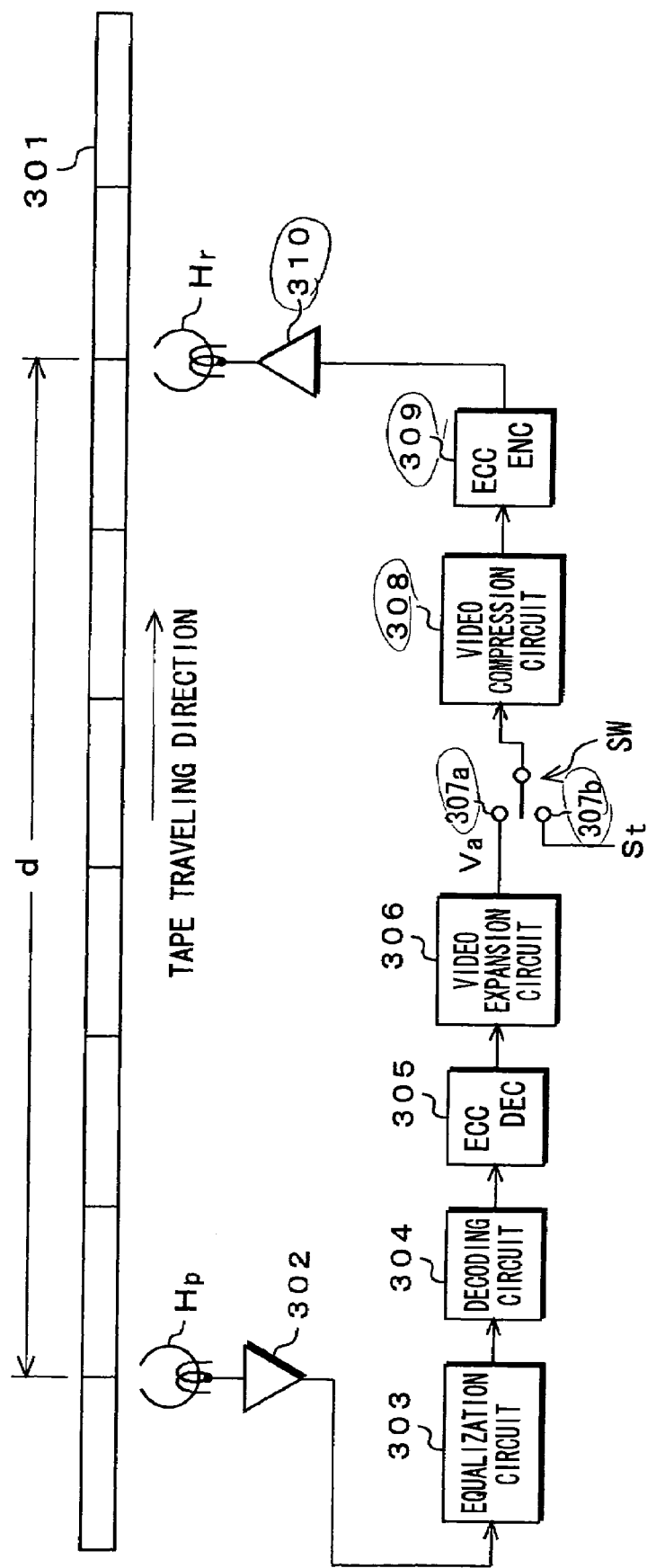
FIG. 3 is a diagram for showing an exemplary pre-read editing system.
Figure 4:
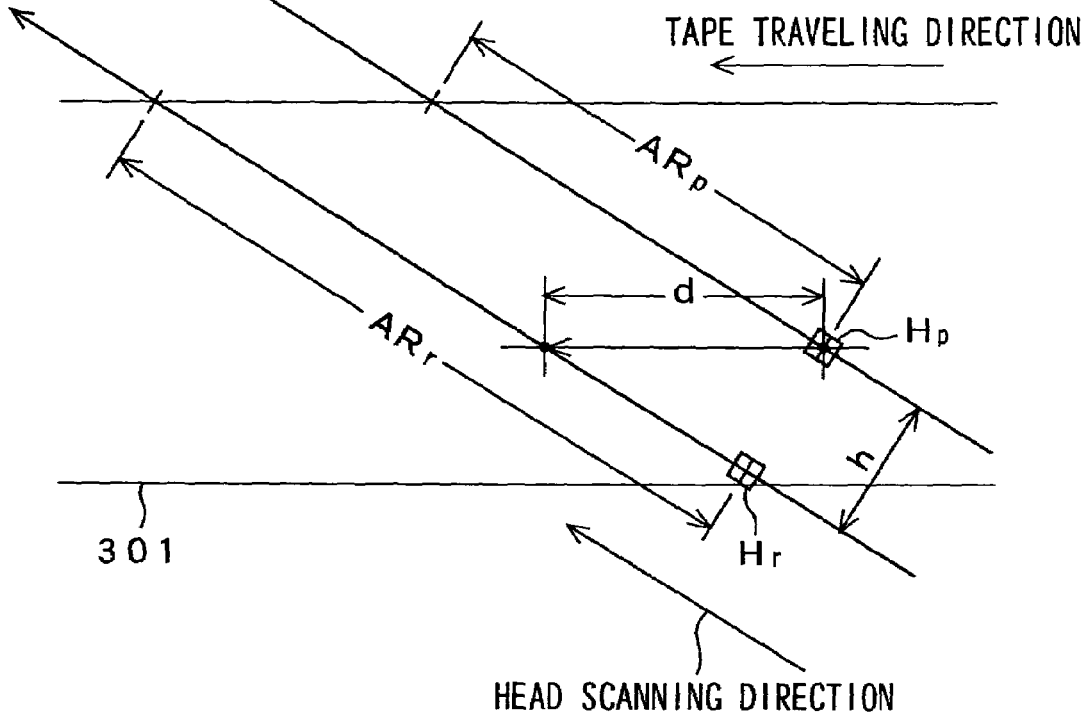
FIG. 4 is a diagram for showing a relationship between a system delay and a step formed between a recording head and a reproduction head in a pre-read editing system.
Figure 14:
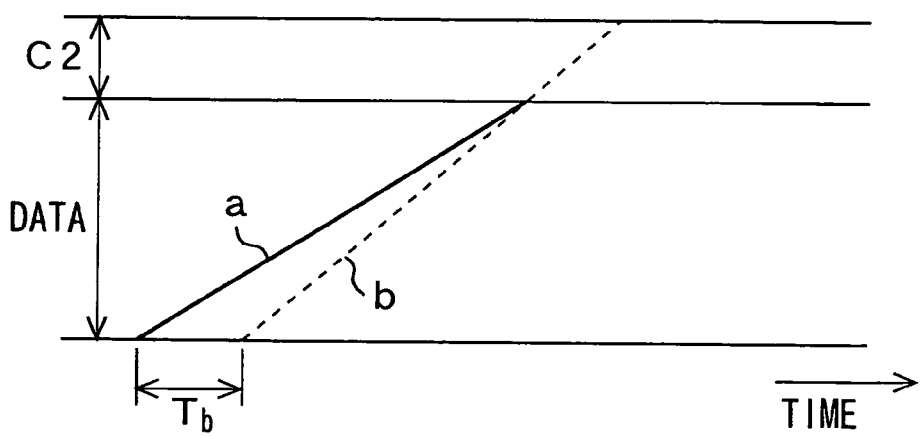
FIG. 14 is a diagram for showing a system delay in an EC encoder (in the case of including 36 calculating apparatus)

FIG. 14 shows a system delay Tb in the ECC encoder 113, where a solid line "a" shows an input process of video data, whereas a broken line "b" shows an output process of C2 parity and video data. As shown in this drawing, the system delay Tb in this embodiment is significantly shortened as compared with the system delay Ta in a prior art (see FIG. 2).

In the embodiment described above, the C2 encoder 155 includes 36 calculating apparatus $170_{-0}$ to $170_{-35}$. Alternatively, the C2 encoder 155 may include only one calculating apparatus having the same configuration as that of the calculating apparatus $170_{-0}$, for example. In this manner, the circuit scale and the memory scale can be reduced.

In this case, after video data for one field, which is a group of video data to be recorded on 12 tracks, is entirely captured in the ECC encoder 113, this one calculating apparatus may calculate the C2 parity in each of the 36 ECC blocks 0 to 35 sequentially.

Figure 15:
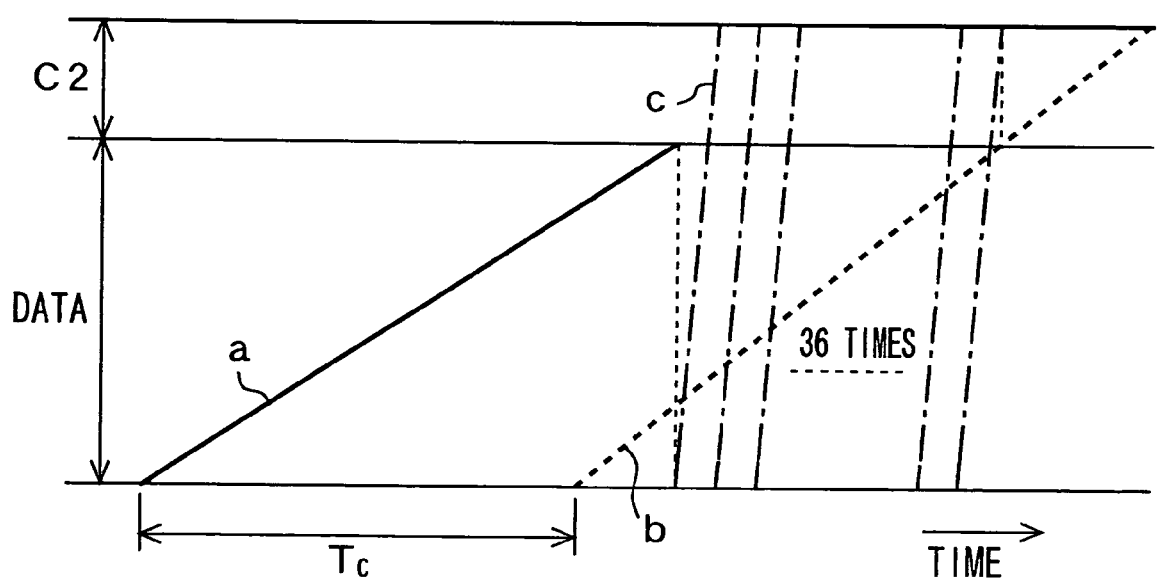
FIG. 15 is a diagram for showing a system delay in an EC encoder (in the case of including one calculating apparatus and the calculation is not divided into a plurality of parts)

FIG. 15 shows an input process of video data (shown by a solid line "a"), a calculation process of the C2 parity in each of the 36 ECC blocks (shown by an alternate long and short dash line "c"), and an output process of the C2 parity and the video data (shown by a broken line "b") observed in this case. Here, in the portion corresponding to "data" in the calculation process of the C2 parity, video data is read from the SDRAM 151, and this read video data is input into the C2 encoder 155 so as to obtain the C2 parity. In the portion corresponding to "C2", the C2 parity obtained by the C2 encoder 155 is written into the SDRAM 151.

Also, in this case, the C2 parity is recorded at one time in a later stage, and it is enough that the calculation of the C2 parity is completed before their recording is started. Therefore, it is possible to start the recording of the video data before the video data for one field, which is a group video data to be recorded on 12 tracks, is entirely captured in the ECC encoder 113.

In this manner, the time required from the initiation of the input of the video data into the ECC encoder 113 to the initiation of the recording of this video data can be shortened. In this case, although the system delay Tc in the ECC encoder 133 is shorter than the system delay Ta in a prior art (see FIG. 2), the system delay Tc is longer than the system delay Tb observed in the case where the C2 encoder 155 includes 36 calculating apparatus $170_{-0}$ to $170_{-35}$ (see FIG. 14).

next, an alternative configuration of the C2 encoder 155 will be described. In the embodiment described above, the C2 encoder 155 includes 36 calculating apparatus $170_{-0}$ to $170_{-35}$. In this alternative embodiment, the C2 encoder 155A includes one calculating apparatus 170 for calculating C2 parity in each of the ECC blocks with the calculation being divided into a plurality of parts.

A configuration of the calculating apparatus 170 will be described with reference to FIGS. 16 to 19. In these drawings, the constituent elements corresponding to those of FIG. 13 are denoted by the same reference numerals.

The calculating apparatus 170 includes n pieces of matrix calculators $200_{-0}$ to $200_{-(n-1)}$, n pieces of RAMs $201_{-0}$ to $201_{-(n-1)}$ for producing codes in a vertical direction, n pieces of exclusive EX-OR gates for calculating exclusive-OR, and (n+1) pieces of selectors $204_{-0}$ to $204_{-n}$.

Here, the output from the matrix calculator $200_{-0}$ is supplied to the P and I sides of the selector $204_{-0}$. The outputs from the selectors $204_{-0}$ to $204_{-(n-1)}$ are respectively supplied to the RAMs $201_{-0}$ to $201_{-(n-1)}$ as write data. The outputs from the matrix calculators $200_{-1}$ to $200_{-(n-1)}$ are respectively supplied to the I sides of the calculators $204_{-1}$ to $204_{-(n-1)}$, and are also supplied to the EX-OR gates $203_{-1}$ to $203_{-(n-1)}$.

Further, the items of the read data from the RAMs $201_{-0}$ to $201_{-(n-1)}$ are respectively supplied to the EX-OR gates $203_{-1}$ to $203_{-n}$. The outputs from the EX-OR gates $203_{-1}$ to $203_{-(n-1)}$ are respectively supplied to the P and R sides of the selectors $204_{-1}$ to $204_{-(n-1)}$, and the output from the EX-OR gate $203_{-n}$ is supplied to P side of the selector $204_{-n}$.

A value "00h" is supplied to the R side of the selector $204_{-n}$. The "h" mean that this value is in hexadecimal. Input data is supplied to the EX-OR gate $203_{-n}$ and I and W sides of the selector $204_{-n}$. Then, output data is taken out from the RAM $201_{-(n-1)}$. Further, the output from the selector $204_{-n}$ is supplied to the matrix calculators $200_{-0}$ to $200_{-(n-1)}$ as feedback data, and is also supplied to the W sides of the selectors $204_{-0}$ to $204_{-(n-1)}$.

An operation control signal is respectively supplied to the selectors $204_{-0}$ to $204_{-n}$. In this case, at the time of initialization, the selectors $204_{-0}$ to $204_{-n}$ output the data, which has been supplied to their I sides. At the time of calculation, the selectors $204_{-0}$ to $204_{-n}$ output the data, which has been supplied to their P sides. At the time of outputting the calculation result of C2 parity (including the result obtained at some midpoint in the calculation), the selectors $204_{-0}$ to $204_{-n}$ output the data, which has been supplied to their R sides. At the time of loading the result obtained at some midpoint in the calculation of C2 parity, the selectors $204_{-0}$ to $204_{-n}$ output the data, which has been supplied to their W sides.

The RAMs $201_{-0}$ to $201_{-(n-1)}$ respectively have a word length in data length of an internal encoding calculation data stream, that is, 226-byte word length. The "n" indicates an identical number to the byte number of the C2 parity, that is, 12.

Next, an operation for calculating the C2 parity in each of the 36 ECC blocks (see FIG. 8) by use of the calculating apparatus 170 will be described. Here, the calculation of C2 parity in each block ECC is performed with the calculation being divided into four times.

Suppose that vide data of the ECC blocks 0 to 35 are simultaneously written into the SDRAM 151. Specifically, video data of the ECC blocks 0 to 35 are written into the SDRAM 151 in the order of the video data of the 0th sync-block in the block 0, video data of the 0th sync-block in the block 1, . . . , video data of 0th sync-block in the block 35, video data of the 1st sync-block in the block 0, video data of the 1st sync-block in the block 1, . . . , video data of the 1st sync-block in the block 35, video data of the 113th sync-block in the block 0, video data of the 113th sync-block in block 1, . . . , and video data of the 113th sync-block in the block 35.

First, a first divided part of the calculation of C2 parity in the ECC block 0 is performed. In this case, first of all, among input data to be encoded, data of the first one symbol (for example, one byte) is read from the SDRAM 151 and is supplied to the calculating apparatus 170 as input data for initialization. FIG. 16 shows a state at the time of initialization. In this case, as the data of the first one symbol, actually, 226 items of byte data in data length of the internal encoding calculation data stream, that is, byte data which respectively correspond to the 226 streams related to the external encoding calculation data stream are sequentially supplied. At the time of initialization, the selectors $204_{-0}$ to $204_{-n}$ respectively output the data, which has been supplied to their I sides. Therefore, at the time of this initialization, the selectors $204_{-0}$ to $204_{-(n-1)}$ respectively supply the outputs from the matrix calculators $200_{-0}$ to $200_{-(n-1)}$ to the subsequent stages without undertaking any processing, and the selectors $204_{-n}$ outputs the input data.

As a result, the first one symbol is supplied to the matrix calculators $200_{-0}$ to $200_{-(n-1)}$ as feedback data without undergoing any processing. Then, the results of calculations performed by the matrix calculators $200_{-0}$ to $200_{-(n-1)}$ are stored at address positions of the RAM $201_{-0}$ to RAM $201_{-(n-1)}$ which correspond to one symbol stream (i.e. any one of 266 streams related to the external encoding calculation data stream) of the input data at that time via the selectors $204_{-0}$ to $204_{-(n-1)}$ respectively. In this manner, initialization is performed. As described above, 226 items of byte data are sequentially supplied as the first one symbol, thereby executing initialization for 226 streams related to the external encoding calculation data stream.

Next, a C2 parity is calculated, FIG. 17 shows a state at the time of calculation. At the time of calculation of the C2 parity, the selectors $204_{-0}$ to $204_{-n}$ respectively output the data, which has been supplied to their P sides. Therefore, at the time of this calculation, the selector $204_{-0}$ supplies the result of calculation performed by the matrix calculator $200_{-0}$ to the subsequent stages and the selectors $204_{-1}$ to $204_{-n}$ respectively supply the outputs from the EX-OR gates $203_{-1}$ to $203_{-n}$ to the subsequent stages.

Among input data, items of the data of each one symbol of second or later are sequentially supplied to the EX-OR gate $203_{-n}$. In this case, as the data of each one symbol of second or later, actually, 226 times of byte data which respectively correspond to the 226 streams related to the external encoding calculation data stream are sequentially supplied. Data of the stream, which is read from the RAM $201_{-(n-1)}$ located at the last stage and corresponds to one symbol stream of the input data at the that time, is supplied to the EX-OR gate $203_{-n}$.

The EX-OR gate $203_{-n}$ calculates exclusive-OR of data of each one symbol of second or later and the data, which has been read from the RAM $201_{-(n-1)}$. The output from the EX-OR gate $203_{-n}$ is supplied to each of the matrix calculators $20_{-0}$ to $200_{-(n-1)}$ as feedback data via the selector $204_{-n}$.

Then, the result of calculation performed by the matrix calculator $200_{-0}$ is stored at an address position which corresponds to one symbol stream of input data of the RAM $201_{-0}$ at that time. The EX-OR gates $203_{-1}$ to $203_{-(n-1)}$ respectively receive the results of calculations performed by the matrix calculators $200_{-1}$ to $200_{-(n-1)}$ and the data of the stream, which corresponds to the stream of input data at that time, to calculate exclusive-OR thereof. The outputs from the EX-OR gates $203_{-1}$ to $203_{-(n-1)}$ are respectively stored at address positions of the RAM $201_{-1}$ to RAM $201_{-(n-1)}$, which correspond to one symbol stream of input data of at that time, via the selectors $204_{-1}$ to $204_{-(n-1)}$ respectively.

As described above, 226 items of byte data are sequentially supplied as data of each one symbol of second or later, thereby executing calculations for 226 streams related to the external encoding calculation data stream. When the last symbol in the first divided part of the calculation of C2 parity is input as input data, the RAM $201_{-1}$ to RAM $201_{-(n-1)}$ store the result obtained at some midpoint of the calculation completed up to the end of the first divided part of the calculation of the C2 parity for 226 straws.

Figure 18:
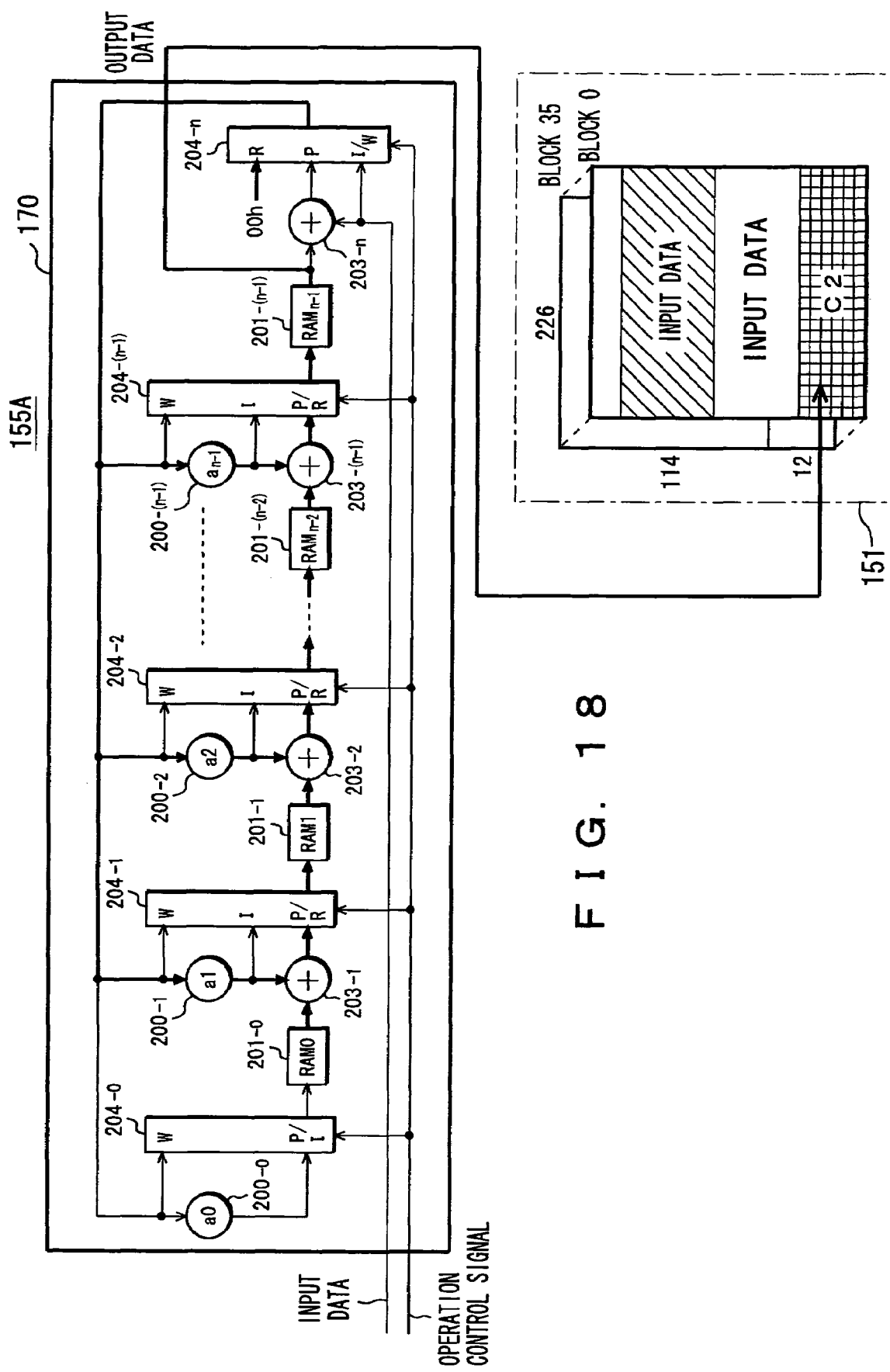
FIG. 18 is a diagram for showing a state of outputting the result of calculation at the time when the calculation of the C2 parity is performed by use of one calculating apparatus with the calculation being divided into a plurality of parts.

Next, the result obtained at some midpoint of the calculation of C2 parity for 226 streams is output. FIG. 18 shows a state at the time of outputting the result obtained at some midpoint of the calculation. At the time of this output, the selectors $203_{-1}$ to $204_{-n}$ respectively output the data, which has been supplied to their R sides. Therefore, at the time of this output, the selectors $204_{-1}$ to $204_{-(n-1)}$ respectively supply the outputs from the EX-OR gates $203_{-1}$ to $203_{-(n-1)}$ to the subsequent stages, and the selector $204_{-n}$ outputs "00h".

In this case, the "00h" is supplied to the matrix calculators $200_{-0}$ to $200_{-(n-1)}$ as feedback data. When the feedback data is "00h", the matrix calculators $200_{-0}$ to $200_{-(n-1)}$ output "00h". Therefore, the EX-OR gates $203_{-1}$ to $203_{-(n-1)}$ other than that located at the last stage, which operate based on the outputs from the matrix calculators $200_{-1}$ to $200_{-(n-1)}$ and the read data from the RAMs $201_{-0}$ to $201_{-(n-2)}$ always output read data from the RAMs $201_{-0}$ to $201_{-(n-2)}$ without under taking any processing to the read data.

In summary, in this case, the RAMs $201_{-0}$ to $201_{-(n-1)}$ simply operate as shift registers. Therefore, the RAM $201_{-(n-1)}$ located at the last stage sequentially outputs the result obtained at the midpoint of the calculation of the C2 parity for 226 streams related to the external encoding calculation data stream. This result obtained from the midpoint of the calculation is supplied to the SDRAM 151 and is written therein.

In the manner described above, the calculation of the C2 parity in the ECC block 0 is completed up to the end of the first divided part of calculation. Hereinafter, the same process as that of the ECC block 0 is repeated for sequentially calculating the C2 parity in the respective ECC blocks 1 to 35 up to the end of the first divided part.

Next, a second divided part of calculation of the C2 parity in ECC block 0 is performed. In this case, first of all, the result obtained at some midpoint of the calculation completed up to the end of the first divided part thereof is loaded. FIG. 19 shows a state at the time of loading.

At the time of loading, the selectors $204_{-0}$ to $204_{-n}$ respectively output the data, which has been supplied to their W sides. Therefore, at the time of this loading, the selector $204_{-n}$ outputs the input data. Then, the selectors $204_{-0}$ to $204_{-(n-1)}$ respectively supply the input data, which has been output from the selector $204_{-n}$ to the RAMs $201_{-n(-1)}$ located at subsequent stages. In this manner, the RAM $201_{-0}$ to $201_{-(n-1)}$ store the result obtained at some midpoint of the calculation of C2 parity in ECC block. As a result, the calculating apparatus 170 returns to the last calculation state in the first divided part.

From this state, the second divided part of the calculation of the C2 parity in the ECC block 0 is obtained. Then, the result obtained at some midpoint of the calculation of C2 parity completed up to the second divided part is output to the SDRAM 151 and is written therein. The operation of calculation and the operation of outputting the result obtained at some midpoint of the calculation are the same as that of the first divided part described above. Hereinafter, the process for the ECC block 0 described above is repeated for sequentially calculating the C2 parity in the respective ECC blocks 1 to 35.

Hereinafter, in the same manner as described above the calculation of the C2 parity in the respective ECC blocks 1 to 35 is continued from the last calculation state in the second divided part up to the end of the third processing part. Then, the calculation of the C2 parity in the respective ECC blocks 1 to 35 is continued from the last calculation state in the third divided part up to the end of the fourth divided part. In the last calculation state of the fourth divided part, the RAMs $201_{-0}$ to $201_{-(n-1)}$ store the C2 parity to be finally obtained, instead of the result obtained at some midpoint of calculation. Therefore, when the calculation of the C2 parity in the respective ECC blocks 1 to 35 is compared in the fourth divided part, the SDRAM 151 stores the C2 parity in the respective 36 ECC blocks 0 to 35.

When the ECC encoder 155 is constituted by one calculating apparatus 170 as described above, the circuit scale and the memory scale can be reduced. In this case, when the calculation of the C2 parity in the respective ECC blocks is divided into a plurality of parts, the calculation of the C2 parity can be initiated before all of the video data for one field, which is a group of video data to be recorded on 12 tracks, is completely captured into the ECC encoder 113. Therefore, the calculation of the C2 parity can be completed at a point of time earlier than the case where the calculation is not divided, and the recording of video data can be initiated earlier by this shortened time. In this manner, the time required from the initiation of the input of the video data to the initiation of the recording of this video data can be shortened.

FIG. 20 shows an input process of video data (shown by a solid line "a"), a calculation process of C2 parity in the respective 36 ECC blocks (shown by an alternate long and short dash line "c"), and an output process of the C2 parity and the video data (shown by a broken line "b") observed in this case.

Here, in the portion corresponding to "data" in the calculation of the C2 parity, video data is read from the SDRAM 151, and this read video data is input into the C2 encoder 155 to execute processing for obtaining the C2 parity. In the portion corresponding to "C2", the result of calculation obtained in the C2 encoder 155 (the result obtained at some midpoint of the calculation or C2 parity) is written into the SDRAM 151, and the result of calculation (the result obtained at some midpoint of the calculation) is read from the SDRAM 151 (loading). The system delay Td in the ECC encoder 133 in this case is significantly shortened as compared with the system delay Tc in the case where the calculation is not divided (see FIG. 15).

Although the above description has described an example where the calculation of the C2 parity in the respective ECC blocks is divided into four parts, this number of divided parts is only an example, and the present invention is not limited thereto. The calculation of the C2 parity can be initiated an at earlier point of time by increasing the number of divided parts. However, an increased number of divided parts will increase the time required for writing and reading into and from the SDRAM 151, and the time required for calculating the C2 parity increases, resulting in a delay of the point of time at which the calculation is completed. Taking these circumstances into consideration, the number of divided parts may be determined so as to minimize the system delay Td.

Further, in the above description, the ECC encoder 155 is constituted by one calculating apparatus 170. Alternatively, the ECC encoder 155 may be constituted by 2 or more but less than 36 calculating apparatus, and the calculation of the C2 parity in the respective ECC blocks may be performed with the calculation being divided into a plurality of parts. For example, the ECC encoder 155 may be constituted by two pieces of calculating apparatus 170. In this case, each of the two pieces of the calculating apparatus 170 performs the calculation of the C2 parity in the respective 18 ECC blocks. Alternatively, the ECC encoder 155 may be constituted by 4 pieces of calculating apparatus 170. In this case, each of the pieces of the calculating apparatus 170 performs the calculation of the C2 parity in the respective 9 ECC blocks.

Further, in the above description, the RAMs $201_{-0}$ to $201_{-(n-1)}$ have a word length in data length of an internal encoding calculation data stream (226 bytes), in order to make it possible to execute the external encoding calculation without converting the input signal in the lateral stream into that in the vertical stream at the time of external encoding calculation. Alternatively, the RAMs $201_{-0}$ to $201_{-(n-1)}$ may have a word length (226 bytes) or less or may be substituted by flip-flops, as far as they additionally include functional blocks for converting the lateral stream into the vertical stream.

In the embodiment described above, although the present invention has been applied to recording video data, the present invention is also applicable for recording audio data. Further, the recording medium is not limited to a magnetic tape, but may be other recording mediums such as magnetic disks, optical disks, and the like.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A data recording method, comprising the steps of:

performing error correction encoding on input data for each encoding unit of a plurality of encoding units by use of a product code to provide error-correcting encoded data;

recording said error-correction encoded data on at least one track of a recording medium in at least one encoding unit;

sequentially recording a first sync-block on said at least one track of said recording medium, said first sync-block being constituted by adding an internal encoding parity to a data string of said input data constituting an internal encoding calculation data stream; and after said first sync-block is completely recorded, sequentially recording a second sync-block, said second sync-block being constituted by adding the internal encoding parity to a data string of an external encoding parity constituting the internal encoding calculation data stream, wherein in each item of said error-correction encoded data recorded on said at least one track of the recording medium in at least one encoding unit, the external encoding parity is calculated with the calculation being divided into a plurality of parts.

2. A data recording apparatus, comprising:

an encoder performing error correction encoding on input data for each encoding unit of a plurality of encoding units by use of a product code to produce error-correction encoded data;

a recorder recording said error-correction encoded data on at least one track of a recording medium in at least one encoding unit, an external encoding parity calculator for calculating and obtaining an external encoding parity for each encoding unit from a data string constituting an external encoding calculation data stream;

an internal encoding parity calculator for calculating and obtaining an internal encoding parity for each encoding unit from a data string constituting an internal encoding calculation data stream; and a recorder recording a first sync-block sequentially on at least one track, said first sync-block being constituted by adding an internal encoding parity obtained by the calculation of said internal encoding parity calculator to a data string of said input data constituting an internal encoding calculation data stream, and recording a second sync-block sequentially after said first sync-block is completely recorded, said second sync-block being constituted by adding the internal encoding parity obtained by the calculation of said internal encoding parity calculator to a data string of the external encoding parity obtained by the calculation of said external encoding parity calculator, said data string of the external encoding parity constituting the internal encoding calculation data stream, wherein error-correction encoded data in m encoding units (where m is an integer of 2 or larger) is recorded on at least one track of said recording medium; and wherein said external encoding parity calculator includes at least said m calculating apparatus for calculating an external encoding parity.

3. A data recording apparatus, comprising:

an encoder performing error correction encoding on input data for each encoding unit of a plurality of encoding units by use of a product code to produce error-correction encoded data;

a recorder recording said error-correction encoded data on at least one track of a recording medium in at least one encoding unit, an external encoding parity calculator for calculating and obtaining an external encoding parity for each encoding unit from a data string constituting an external encoding calculation data stream; internal encoding parity calculator for calculating and obtaining an internal encoding parity for each encoding unit from a data string constituting an internal encoding calculation data stream;

a recorder recording a first sync-block sequentially on at least one track, said first sync-block being constituted by adding an internal encoding parity obtained by the calculation of said internal encoding parity calculator to a data string of said input data constituting an internal encoding calculation data stream, and recording a second sync-block sequentially after said first sync-block is completely recorded, said second sync-block being constituted by adding the internal encoding parity obtained by the calculation of said internal encoding parity calculator to a data string of the external encoding parity obtained by the calculation of said external encoding parity calculator, said data string of the external encoding parity constituting the internal encoding calculation data stream, wherein error-correction encoded data in m encoding units (where m is an integer of 2 or larger) is recorded on at least one track of said recording medium; wherein said external encoding parity calculator includes calculating apparatus in the number smaller than said m; and wherein in each of the m encoding units of said data, the external encoding parity is calculated with the calculation being divided into a plurality of parts.

4. A data recording method comprising the steps of:

performing error correction encoding on input data for each recording unit of a plurality of encoding units by use of a product code to provide error correction encoded data;

recording the error correction encoded data on one or a plurality of tracks of a recording medium in one or a plurality of encoding units;

sequentially recording a first sync-block on one or a plurality of tracks, wherein the first sync-block is constituted by adding an internal encoding C1 parity to a data string of the input data constituting an internal encoding calculation data stream;

after completely recording the first sync-block, sequentially recording a second sync-block wherein the second sync-block is constituted by adding the internal encoding parity C1 parity to a data string of an external encoding C2 parity constituting the internal encoding calculation data stream, wherein the C2 parity is recorded at one time in a later stage.

5. The method as set forth in claim 4, wherein the calculation of the C2 parity has been completed before its recording is started, so that the recording of input data can be initiated even before a group of the input data to be recorded on one or a plurality of tracks is entirely captured, thus enabling the time required from the initiation of the input of the input data to the initiation of the recording of this input data to be shortened.

6. A data recording apparatus, comprising:

means for performing error correction encoding on input data for each encoding unit of a plurality of input units by use of a product code to provide error correction encoded data;

means for recording the error correction encoded data on one or a plurality of tracks of a recording medium in one or a plurality of encoding units;

an external encoding parity calculator for calculating and obtaining an external encoding parity for each encoding unit from a data string constituting an external encoding calculation data stream;

an internal encoding parity calculator for calculating and obtaining an internal encoding parity for each encoding unit from data string constituting an internal encoding calculation data stream; and a recorder for recording a first sync-block sequentially on one or a plurality of tracks, and recording second sync-block sequentially after the first sync-block is completely recorded.

7. The apparatus as set forth in claim 6, wherein the first sync-block is constituted by adding an internal encoding parity obtained by the calculation of the internal encoding parity calculator to data string of the input data constituting an internal encoding calculation data stream, and the second sync-block is constituted by adding the internal encoding parity obtained by the calculation of the internal encoding parity calculator to data string of the external encoding parity obtained by the calculation of the external encoding parity calculator, wherein the data string of the external encoding parity also constitutes the internal encoding calculation data stream.

8. The apparatus as set forth in claim 7, wherein, when error-correction encoded data in m encoding means, where m is an integer of 2 or larger, is recorded on one or a plurality of tracks of a recording medium, at least m calculating apparatus for calculating C2 parity are provided.

9. The apparatus as set forth in claim 8, wherein, since the calculation of C2 parity in m pieces of encoding units is simultaneously executed in independent calculating apparatus, the calculations of C2 parity in m encoding units also is completed when a group of input data to be recorded on one or a plurality of tracks has been entirely captured, thus allowing the initiation of C2 parity recording to be made earlier, thereby enabling the initiation of input data recording to be made accordingly earlier.

10. The apparatus as set forth in claim 9, wherein, when error-correction encoded data in m encoding units, where m is an integer of 2 or larger, is recorded on one or a plurality of tracks of a recording medium, if there are calculating apparatus for calculating C2 parity in the number smaller than m, the C2 parity is calculated in each of the m encoding units of the data with the calculation being divided into a plurality of parts.

11. The apparatus as set forth in claim 10, wherein, if there are calculating apparatus in the number smaller than m, the calculation of the C2 parity in the respective m pieces of encoding units is initiated after a group of input data to be recorded on one or a plurality of tracks is entirely captured, so that, when the calculation of the C2 parity in each of the m pieces of encoding units is performed with the calculation being divided into a plurality of parts, the calculation of the C2 parity in the m encoding units can be initiated before a group of input data to be recorded on one or a plurality of tracks is not completely captured so that the calculation of the C2 parity is completed at an earlier point of time, and the recording of the input data is initiated at earlier point of time.

* * * * *

UNITED STATES PATENT AND TRADEMARK OFFICE
CERTIFICATE OF CORRECTION

| | | |
|---|---|---|
| PATENT NO. | : 7,266,751 B2 | Page 1 of 1 |
| APPLICATION NO. | : 10/815689 | |
| DATED | : September 4, 2007 | |
| INVENTOR(S) | : Kaoru Urata et al. | |

It is certified that error appears in the above-identified patent and that said Letters Patent is hereby corrected as shown below:

Column 20, Line 36:
"are calculating" should read -- is a calculating --.

Signed and Sealed this

Eighteenth Day of December, 2007

JON W. DUDAS
*Director of the United States Patent and Trademark Office*